United States Patent
Li et al.

(10) Patent No.: US 12,537,392 B2
(45) Date of Patent: Jan. 27, 2026

(54) WIRELESS CHARGING MODULE, CONTROL CIRCUIT, AND ELECTRONIC DEVICE

(71) Applicant: HUAWEI DIGITAL POWER TECHNOLOGIES CO., LTD., Shenzhen (CN)

(72) Inventors: Yuechao Li, Dongguan (CN); Chao Wang, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 101 days.

(21) Appl. No.: 18/356,339

(22) Filed: Jul. 21, 2023

(65) Prior Publication Data
US 2024/0039337 A1    Feb. 1, 2024

(30) Foreign Application Priority Data
Jul. 29, 2022    (CN) .......................... 202210910851.4

(51) Int. Cl.
*H02J 50/12*    (2016.01)
*H02M 3/158*    (2006.01)
*H02M 7/538*    (2007.01)

(52) U.S. Cl.
CPC ........... *H02J 50/12* (2016.02); *H02M 3/1582* (2013.01); *H02M 7/53803* (2013.01); *H02J 2207/20* (2020.01)

(58) Field of Classification Search
CPC .. H02J 50/12; H02J 2207/20; H02M 7/53803; H02M 3/1582

(Continued)

(56) References Cited

U.S. PATENT DOCUMENTS

| | | | |
|---|---|---|---|
| 11,757,307 B2* | 9/2023 | Peralta | H02J 50/12 307/104 |
| 2014/0159500 A1* | 6/2014 | Sankar | H02J 50/12 307/104 |

(Continued)

FOREIGN PATENT DOCUMENTS

| | | |
|---|---|---|
| CN | 109302070 A | 2/2019 |
| CN | 209217749 U | 8/2019 |

(Continued)

OTHER PUBLICATIONS

Extended European Search Report in European Appln. No. 23186122.0, mailed on May 10, 2024, 12 pages.

(Continued)

*Primary Examiner* — Michael R. Fin
(74) *Attorney, Agent, or Firm* — Fish & Richardson P.C.

(57) ABSTRACT

Example wireless charging methods and apparatus are described. In one example, a wireless charging module includes a control circuit, a charging coil, a tunable capacitor module, and a converter circuit. The converter circuit includes at least one of a rectifier circuit or an inverter circuit. The tunable capacitor module is connected in series between the charging coil and the converter circuit. The tunable capacitor module includes a plurality of capacitors and at least one controllable switch. The control circuit controls the at least one controllable switch to be turned on or off, to control an equivalent capacitance value of the tunable capacitor module. The equivalent capacitance value of the tunable capacitor module includes one of a first capacitance value or a second capacitance value.

11 Claims, 11 Drawing Sheets

(58) Field of Classification Search
USPC .......................................................... 307/104
See application file for complete search history.

(56) References Cited

U.S. PATENT DOCUMENTS

2017/0085097 A1* 3/2017 Xiao ........................ H02J 50/12
2018/0034506 A1* 2/2018 Moore .................. H02J 50/402

FOREIGN PATENT DOCUMENTS

| CN | 110277820 A | 9/2019 |
| CN | 113067395 B | 6/2024 |
| WO | 2021051837 A1 | 3/2021 |

OTHER PUBLICATIONS

Office Action in Korean Appln. No. 10-2022-7024388, mailed on May 30, 2025, 13 pages (with English translation).
State Grid Corporation of China Jiangsu Electric Power Company, "Three-in-one' Electronic Highway Technology and Application," Southeast University Press, Sep. 2020, 18 pages (with English translation).

* cited by examiner

WIRELESS CHARGING MODULE, CONTROL CIRCUIT, AND ELECTRONIC DEVICE

CROSS-REFERENCE TO RELATED APPLICATION

This application claims priority to Chinese Patent Application No. 202210910851.4, filed on Jul. 29, 2022, which is hereby incorporated by reference in its entirety.

TECHNICAL FIELD

This application relates to the field of wireless charging technologies, and in particular, to a wireless charging module, a control circuit, and an electronic device.

BACKGROUND

With continuous popularization of power-consuming devices and continuous development of electromagnetic technologies, wireless charging technologies are gradually implemented. In an existing wireless charging technology, to implement compatibility between a conventional constant-voltage frequency-regulation charging mode and a private fast charging mode, resonant capacitors of a wireless charging receiving device and a wireless charging transmitting device in the technology are designed according to a requirement that the constant-voltage frequency-regulation charging mode can be supported. As a result, working efficiency of the wireless charging transmitting device and the wireless charging receiving device is low, and a charging loss is large, a temperature rise is obvious, and over-temperature power reduction is easily triggered in the private fast charging mode, hindering an increase in an average charging speed of the technology.

SUMMARY

To resolve the foregoing problem, this application provides a wireless charging module, a control circuit, and an electronic device, to improve applicability and practicability of a wireless charging technology.

According to a first aspect, an embodiment of this application provides a wireless charging module. The wireless charging module includes a control circuit, a charging coil, a tunable capacitor module, and a converter circuit. The converter circuit includes at least one of a rectifier circuit or an inverter circuit. The tunable capacitor module is connected in series between the charging coil and the converter circuit. The tunable capacitor module includes a plurality of capacitors and at least one controllable switch. The control circuit is configured to control the at least one controllable switch to be turned on or off, to control an equivalent capacitance value of the tunable capacitor module. The equivalent capacitance value of the tunable capacitor module includes at least a first capacitance value and a second capacitance value.

According to the wireless charging module and the control circuit of the wireless charging module provided in this application, the equivalent capacitance value of the tunable capacitor module may be controlled by using the at least one controllable switch of the tunable capacitor module, so that the wireless charging module can adapt to different working scenarios by changing the equivalent capacitance value of the tunable capacitor module 22, and the wireless charging module can work in a bias inductive state in a conventional constant-voltage frequency-regulation charging mode, to ensure compatibility with a conventional constant-voltage frequency-regulation charging mode. The wireless charging module can also work in a resonant or approximately resonant state with high charging efficiency, to reduce a charging loss and improve charging efficiency. Therefore, the wireless charging module 20 provided in this application can perform charging in a more efficient working mode while being compatible with a constant-voltage frequency-regulation charging mode, thereby significantly improving applicability and practicability of a wireless charging technology.

With reference to the first aspect, in a possible implementation, the tunable capacitor module includes a first capacitor, at least one parallel capacitor, and the at least one controllable switch, the first capacitor is connected in series between the charging coil and a converter circuit, and the at least one parallel capacitor is connected in parallel to the first capacitor by using the at least one controllable switch. In response to that one or more of the at least one controllable switch are turned off, the equivalent capacitance value of the tunable capacitor module is equal to the first capacitance value. In response to that the at least one controllable switch is all turned on, the equivalent capacitance value of the tunable capacitor module is equal to the second capacitance value.

In embodiments of this application, the tunable capacitor module includes a first capacitor, at least one parallel capacitor, and at least one controllable switch connected in series to the at least one parallel capacitor. The tunable capacitor module of the wireless charging module provided in embodiments of this application has a simple structure and low costs. This ensures compatibility of a charging mode of the wireless charging module without significantly increasing costs of the wireless charging module.

With reference to the first aspect, in a possible implementation, the tunable capacitor module includes a first capacitor, at least one series capacitor, and the at least one controllable switch. The first capacitor and the at least one series capacitor are connected in series between the charging coil and a converter circuit. The at least one controllable switch is separately connected in parallel to the at least one series capacitor. In response to that one or more of the at least one controllable switch are turned off, the equivalent capacitance value of the tunable capacitor module is equal to the first capacitance value. In response to that the at least one controllable switch is all turned on, the equivalent capacitance value of the tunable capacitor module is equal to the second capacitance value.

In embodiments of this application, the tunable capacitor module includes a first capacitor, at least one series capacitor, and at least one controllable switch, and one series capacitor is connected in parallel to one controllable switch. The tunable capacitor module in the wireless charging module provided in embodiments of this application bears a low voltage stress, so that the wireless charging module can be applied to a wireless charging scenario with a high voltage and a small current, and applicability of the wireless charging module can be improved.

With reference to the first aspect, in a possible implementation, the wireless charging module is configured to generate an alternating magnetic field, the inverter circuit is configured to convert a direct current into an alternating current, and the charging coil is configured to receive the alternating current and generate the alternating magnetic field. The inverter circuit may run in a constant-frequency voltage-regulation mode or a constant-voltage frequency-regulation mode. In response to that the inverter circuit runs in the constant-frequency voltage-regulation mode, the control circuit may control one or more controllable switches of the tunable capacitor module to be turned off. In response to that the inverter circuit runs in the constant-voltage frequency-regulation mode, the control circuit controls all the controllable switches of the tunable capacitor module to be turned on.

In embodiments of this application, the wireless charging module may correspondingly adjust the equivalent capacitance value of the tunable capacitor module based on a working mode of the included inverter circuit, so that a resonance frequency of the tunable capacitor module and the charging coil is equal to a working frequency of the inverter circuit, and the wireless charging module can work in a resonant or approximately resonant state with high charging efficiency, thereby reducing a charging loss. Alternatively, the resonance frequency of the tunable capacitor module and the charging coil is less than a minimum working frequency of the inverter circuit, so that the tunable capacitor module can work in a bias inductive state in a conventional constant-voltage frequency-regulation charging mode, thereby ensuring compatibility with the constant-voltage frequency-regulation charging mode.

With reference to the first aspect, in a possible implementation, the control circuit controls one or more of the at least one controllable switch to be turned off, so that a resonance frequency of the tunable capacitor module and the charging coil is equal to a working frequency of the inverter circuit. The control circuit controls all the at least one controllable switch to be turned on, so that the resonance frequency of the tunable capacitor module and the charging coil is less than a minimum working frequency of the inverter circuit.

With reference to the first aspect, in a possible implementation, the wireless charging module may further include a DC/DC conversion circuit (that is, a DC-DC converter). The DC/DC conversion circuit is connected to a direct current source, an inverter circuit, and a control circuit. During actual working, under control of the control circuit, the DC/DC conversion circuit may be configured to: convert a direct current provided by the direct current source into a direct current of a target voltage required by the inverter circuit, and output the direct current to the inverter circuit.

In embodiments of this application, the wireless charging module further includes a DC/DC conversion circuit. The wireless charging module converts, by using the DC/DC conversion circuit, a direct current provided by the direct current source into a direct current of a voltage required by the inverter circuit. In this way, adaptability of the wireless charging module to the direct current source can be improved.

With reference to the first aspect, in a possible implementation, the wireless charging module is configured to receive an alternating magnetic field. The charging coil is configured to receive an alternating magnetic field generated by a wireless power supply device and output an alternating current. The rectifier circuit is configured to convert the alternating current into a direct current. In response to that the wireless power supply device runs in a constant-frequency voltage-regulation mode, the control circuit controls one or more of the at least one controllable switch to be turned off. Alternatively, in response to that the wireless power supply device runs in a constant-voltage frequency-regulation mode, the control circuit controls all the at least one controllable switch to be turned on. The control circuit is further configured to control, based on an induced voltage of the charging coil, the rectifier circuit to run in a half-bridge voltage-multiplying rectification mode or a full-bridge rectification mode.

In embodiments of this application, the wireless charging module correspondingly adjusts the equivalent capacitance value of the tunable capacitor module based on a working mode of the wireless power supply device, so that the resonance frequency of the tunable capacitor module and the charging coil is equal to a working frequency of an alternating magnetic field provided by the wireless power supply device, or is less than a minimum working frequency of an alternating magnetic field provided by the wireless power supply device. In this way, the wireless charging module can work in a resonant or approximately resonant state with high charging efficiency and can also work in a bias inductive state in a conventional constant-voltage frequency-regulation charging mode.

With reference to the first aspect, in a possible implementation, the rectifier circuit includes a first half bridge and a second half bridge that are connected in parallel. The control circuit is configured to: in response to that the induced voltage of the charging coil is less than or equal to a preset voltage, control an upper bridge arm and a lower bridge arm of the first half bridge to be alternately turned on or off, an upper bridge arm of the second half bridge to be turned on and a lower bridge arm of the second half bridge to be turned off or the upper bridge arm of the second half bridge to be turned off and the lower bridge arm of the second half bridge to be turned on, so that the rectifier circuit runs in the half-bridge voltage-multiplying rectification mode; or in response to that the induced voltage of the charging coil is greater than the preset voltage, control both the upper bridge arm of the first half bridge and the lower bridge arm of the second half bridge and both the lower bridge arm of the first half bridge and the upper bridge arm of the second half bridge to be alternately turned on or off, so that the rectifier circuit runs in the full-bridge rectification mode.

In embodiments of this application, the control circuit is further configured to control, based on the induced voltage of the charging coil, the rectifier circuit to run in the half-bridge voltage-multiplying rectification mode or the full-bridge rectification mode, to control a voltage magnitude of a direct current voltage provided by the rectifier circuit to a load. In this way, adaptability of the wireless charging module to the load and the wireless power supply device can be improved.

With reference to the first aspect, in a possible implementation, the control circuit controls one or more of the at least one controllable switch of the tunable capacitor module to be turned off, so that a resonance frequency of the tunable capacitor module and the charging coil is equal to a preset frequency or a working frequency of the alternating magnetic field provided by the wireless power supply device. The control circuit controls all the at least one controllable switch to be turned on, so that the resonance frequency of the tunable capacitor module and the charging coil is less than a minimum working frequency of the alternating magnetic field provided by the wireless power supply device.

With reference to the first aspect, in a possible implementation, the wireless charging module further includes a DC/DC conversion circuit, and the DC/DC conversion circuit is connected to a rectifier circuit, the load, and the control circuit. During actual working, under control of the control circuit, the DC/DC conversion circuit may be configured to: convert a direct current outputted by the rectifier circuit into a direct current of a preset target voltage, and output the direct current to the load.

In embodiments of this application, the wireless charging module further includes a DC/DC conversion circuit. The wireless charging module converts, by using the DC/DC conversion circuit, a direct current outputted by the rectifier circuit into a direct current of a preset voltage. In this way, an adjustment range of an output voltage of the wireless charging module can be further extended, thereby improving adaptability of the wireless charging module to the load.

According to a second aspect, this application provides a control circuit for a wireless charging module. The control circuit may be applied to a scenario in which the wireless charging module receives a direct current and transmits an alternating magnetic field. The wireless charging module includes the control circuit, a charging coil, a tunable capacitor module, and an inverter circuit. The tunable capacitor module is connected in series between the charging coil and the inverter circuit. The tunable capacitor module includes a plurality of capacitors and at least one controllable switch. The control circuit is configured to control the at least one controllable switch to be turned on or off, to control an equivalent capacitance value of the tunable capacitor module. The equivalent capacitance value of the tunable capacitor module includes at least a first capacitance value and a second capacitance value. The control circuit is configured to control the inverter circuit to run in a constant-frequency voltage-regulation mode or a constant-voltage frequency-regulation mode, and is configured to: in response to that the inverter circuit runs in the constant-frequency voltage-regulation mode, control the equivalent capacitance value of the tunable capacitor module to be equal to the first capacitance value; or in response to that the inverter circuit runs in the constant-voltage frequency-regulation mode, control the equivalent capacitance value of the tunable capacitor module to be equal to the second capacitance value.

With reference to the second aspect, in a possible implementation, the tunable capacitor module includes a first capacitor, at least one parallel capacitor, and the at least one controllable switch. The first capacitor is connected in series between the charging coil and a converter circuit. The at least one parallel capacitor is connected in parallel to the first capacitor by using the at least one controllable switch. The control circuit controls one or more of the at least one controllable switch to be turned off, so that the equivalent capacitance value of the tunable capacitor module is equal to the first capacitance value. The control circuit controls all the at least one controllable switch to be turned on, so that the equivalent capacitance value of the tunable capacitor module is equal to the second capacitance value.

With reference to the second aspect, in a possible implementation, the tunable capacitor module includes a first capacitor, at least one series capacitor, and the at least one controllable switch. The first capacitor and the at least one series capacitor are connected in series between the charging coil and a converter circuit. The at least one controllable switch is separately connected in parallel to the at least one series capacitor. The control circuit controls one or more of the at least one controllable switch to be turned off, so that the equivalent capacitance value of the tunable capacitor module is equal to the first capacitance value. The control circuit controls all the at least one controllable switch to be turned on, so that the equivalent capacitance value of the tunable capacitor module is equal to the second capacitance value.

According to a third aspect, this application provides a control circuit for a wireless charging module, and the control circuit may be applied to a scenario in which the wireless charging module receives an alternating magnetic field and outputs a direct current. The wireless charging module includes the control circuit, a charging coil, a tunable capacitor module, and a rectifier circuit. The charging coil is configured to receive the alternating magnetic field. The tunable capacitor module is connected in series between the charging coil and the rectifier circuit. The tunable capacitor module is connected in series between the charging coil and the rectifier circuit. The tunable capacitor module includes a plurality of capacitors and at least one controllable switch. The control circuit is configured to control the at least one controllable switch to be turned on or off, to control an equivalent capacitance value of the tunable capacitor module. The equivalent capacitance value of the tunable capacitor module includes at least a first capacitance value and a second capacitance value. The control circuit is configured to: in response to that the wireless power supply device runs in a constant-voltage frequency-regulation mode, control the equivalent capacitance value of the tunable capacitor module to be equal to the first capacitance value; or in response to that the wireless power supply device runs in a constant-frequency voltage-regulation mode, control the equivalent capacitance value of the tunable capacitor module to be equal to or less than the second capacitance value and greater than the first capacitance value; and control, based on an induced voltage of the charging coil, the rectifier circuit to run in a half-bridge voltage-multiplying rectification mode or a full-bridge rectification mode.

With reference to the third aspect, in a possible implementation, the control circuit is configured to: in response to that the induced voltage of the charging coil is less than or equal to a preset voltage, control the rectifier circuit to run in the half-bridge voltage-multiplying rectification mode; and in response to that the induced voltage of the charging coil is greater than the preset voltage, control the rectifier circuit to work in the full-bridge rectification mode.

With reference to the third aspect, in a possible implementation, the rectifier circuit includes a first half bridge and a second half bridge that are connected in parallel, and the control circuit is configured to: control an upper bridge arm and a lower bridge arm of the first half bridge to be alternately turned on or off, an upper bridge arm of the second half bridge to be turned on and a lower bridge arm of the second half bridge to be turned off or the upper bridge arm of the second half bridge to be turned off and the lower bridge arm of the second half bridge to be turned on, so that the rectifier circuit runs in the half-bridge voltage-multiplying rectification mode; or control both an upper bridge arm of the first half bridge and a lower bridge arm of the second half bridge and both a lower bridge arm of the first half bridge and an upper bridge arm of the second half bridge to be alternately turned on or off, so that the rectifier circuit runs in the full-bridge rectification mode.

According to a fourth aspect, this application provides an electronic device, including the wireless charging module according to any one of the first aspect or the possible implementations of the first aspect, or the control circuit according to any one of the second aspect, the third aspect, or the possible implementations of the second aspect or the third aspect.

The solutions provided in the second aspect to the fourth aspect are used to implement or cooperate to implement the wireless charging module provided in any one of the first aspect, and therefore can achieve beneficial effects the same as or corresponding to those in the first aspect. Details are not described herein again.

In summary, through the implementation of embodiments of this application, the wireless charging module can perform charging in a more efficient working mode while being compatible with a conventional constant-voltage frequency-regulation charging mode, thereby improving applicability and practicability of a wireless charging technology.

DESCRIPTION OF EMBODIMENTS

Figure 1:
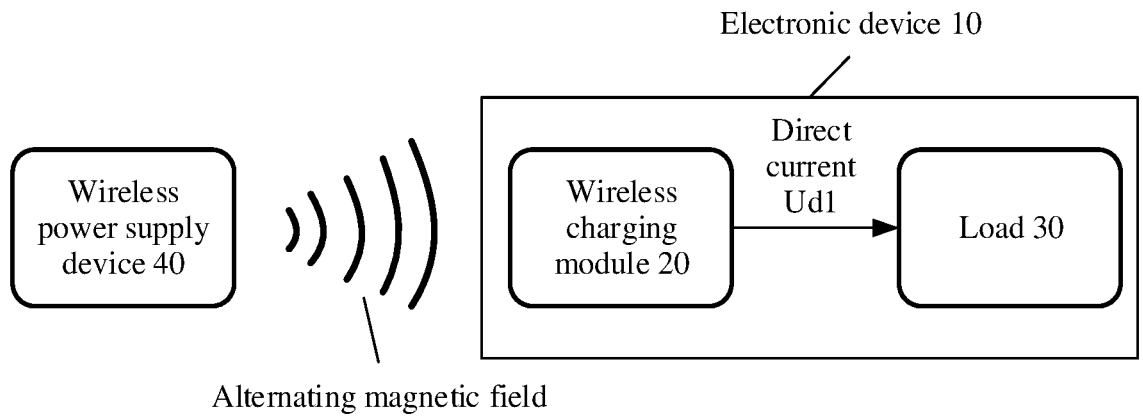
FIG. 1 is a schematic diagram of a structure of an electronic device according to this application.

The following clearly describes the technical solutions in embodiments of this application with reference to the accompanying drawings in embodiments of this application.

It may be understood that the connection relationship described in this application is a direct connection or an indirect connection. For example, that A is connected to B may not only be that A is directly connected to B, but also be that A is indirectly connected to B by using one or more other electrical components. For example, it may be that A is directly connected to C, and C is directly connected to B. In this way, A is connected to B by using C. It may be further understood that "A is connected to B" described in this application may be that A is directly connected to B, or may be that A is indirectly connected to B by using one or more other electrical components.

In descriptions of this application, unless otherwise specified, "/" means "or". For example, A/B may represent A or B. A term "and/or" in this specification describes only an association relationship between associated objects and indicates that there may be three relationships. For example, A and/or B may represent the following three cases: Only A exists, both A and B exist, and only B exists. In descriptions of this application, terms such as "first" and "second" are merely used to distinguish between different objects, and do not limit quantities and execution sequences. In addition, terms such as "first" and "second" are not limited to be definitely different. In addition, terms "include", "have", or any other variant thereof are intended to cover a non-exclusive inclusion.

In an existing wireless charging technology, to implement compatibility between a conventional constant-voltage frequency-regulation charging mode and a private fast charging mode, resonant capacitors in the technology have constraints in design. Working efficiency of the wireless charging transmitting device and the wireless charging receiving device is low, and a loss is large, a temperature rise is obvious, and over-temperature power reduction is easily triggered in the private fast charging mode, hindering an increase in an average charging speed of the technology. Therefore, a technical problem to be resolved in this application is how to improve charging efficiency of wireless charging and retain compatibility with a conventional constant-voltage frequency-regulation charging mode, to improve applicability and practicability of a wireless charging technology.

To resolve the foregoing problem, this application provides a wireless charging module, a control circuit, and an electronic device. In the wireless charging module, a tunable capacitor module with a variable capacitance value is used as a compensation capacitor, and an equivalent capacitance value of the tunable capacitor module is correspondingly adjusted based on different working scenarios, so that the wireless charging module can work in a resonant or approximately resonant state with high charging efficiency and can work in a bias inductive state of a constant-voltage frequency-regulation charging mode. In embodiments of this application, the bias inductive state is a state in which a resonance frequency of a charging coil and the tunable capacitor module in the wireless charging module is less than a minimum working frequency of an inverter circuit or an alternating magnetic field. The wireless charging module provided in this application can perform charging in a more efficient working mode while being compatible with a constant-voltage frequency-regulation charging mode, thereby significantly improving applicability and practicability of a wireless charging technology.

FIG. 1 is a schematic diagram of a structure of an electronic device according to this application. As shown in FIG. 1, an electronic device 10 may include a wireless charging module 20 and a load 30. The wireless charging module 20 includes a rectifier circuit. The electronic device 10 is configured to: receive an alternating magnetic field provided by a wireless power supply device 40, and provide a direct current Ud1 to the load 30. In other words, the electronic device 10 works as a wireless charging receiving device. Specifically, the wireless charging module 20 is configured to: receive the alternating magnetic field generated by the wireless power supply device 40, and generate the corresponding direct current Ud1. The wireless charging module 20 outputs the direct current Ud1 to supply power to the load 30. In embodiments of this application, the electronic device 10 may be a power-consuming device that supports wireless charging, for example, a mobile phone, a notebook computer, a computer case, an electric vehicle, a smart speaker, a smartwatch, or a wearable device.

Figure 2:
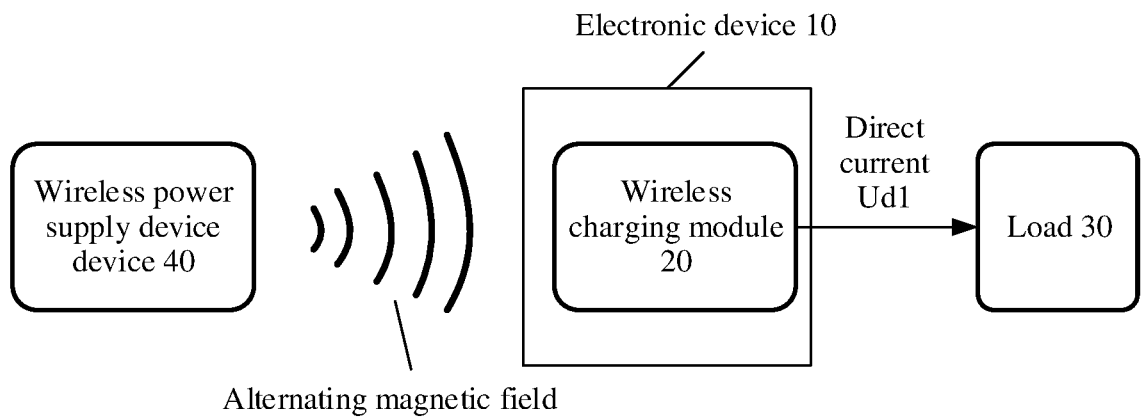
FIG. 2 is another schematic diagram of a structure of an electronic device according to this application.

FIG. 2 is another schematic diagram of a structure of an electronic device according to this application. As shown in FIG. 2, the electronic device 10 may include the wireless charging module 20. The wireless charging module 20 may include the rectifier circuit. The electronic device 10 is configured to: receive an alternating magnetic field provided by the wireless power supply device 40, and provide the direct current Ud1 to the load 30. Specifically, the wireless charging module 20 is configured to: receive the alternating magnetic field provided by the wireless power supply device 40, and generate the direct current Ud1. The electronic device 10 outputs the direct current Ud1 to supply power to the load 30. In embodiments of this application, the electronic device 10 may be a power module or an adapter of a power-consuming device that supports wireless charging, for example, a mobile phone, a notebook computer, a computer case, an electric vehicle, a smart speaker, a smartwatch, or a wearable device.

Figure 3:
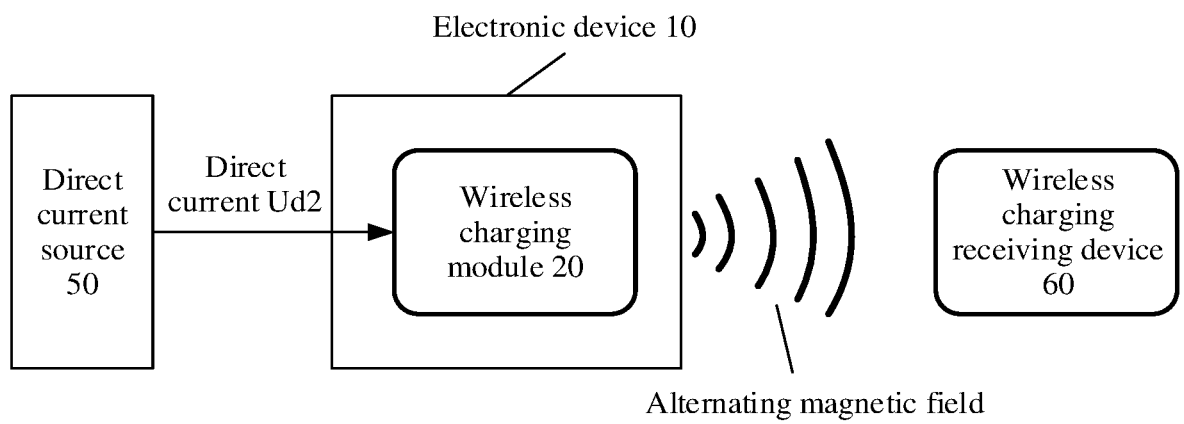
FIG. 3 is another schematic diagram of a structure of an electronic device according to this application.

FIG. 3 is another schematic diagram of a structure of an electronic device according to this application. As shown in FIG. 3, the electronic device 10 may include the wireless charging module 20. The wireless charging module 20 may include an inverter circuit. The electronic device 10 may be used as a wireless charging transmitting device to provide an alternating magnetic field to a wireless charging receiving device 60 corresponding to the electronic device 10. Specifically, the wireless charging module 20 may be configured to: receive a direct current Ud2 provided by a direct current source 50, convert the direct current Ud2 into the alternating magnetic field, and transmit the alternating magnetic field to the wireless charging receiving device 60. In embodiments of this application, the electronic device 10 may be a device, for example, an adapter that supports wireless charging, a wireless charging pile, a wireless charging dock, or a wireless charging transmitter placed on or under the ground.

In embodiments of this application, the adapter may also be referred to as a charger, a charging head, a switch-mode power supply, a power converter, or the like. In embodiments of this application, the wireless charging receiving device 60 may be a device that can receive an alternating magnetic field and generate a corresponding direct current in various forms.

In embodiments of this application, the electronic device 10 may be used as a wireless charging transmitting device to provide an alternating magnetic field to another device, or may be used as a wireless charging receiving device to obtain an alternating magnetic field from a wireless power supply device and provide a required direct current to a load. Specifically, the wireless charging module 20 of the electronic device 10 may include the rectifier circuit and the inverter circuit. In an embodiment, the rectifier circuit and the inverter circuit of the wireless charging module 20 may be bridge circuits. For example, the bridge circuits may implement rectification, or may implement inversion.

In embodiments of this application, the direct current source 50 may be a device that is in one of different forms and that can provide a required direct current to the wireless charging module 20. The load 30 of the electronic device 10 may include one or more of a power apparatus, an energy storage apparatus, or an external device. In an embodiment, the load 30 may be the power apparatus of the electronic device 10. For example, the load 30 may be a processor, a display, or the like. In an embodiment, the load 30 may be the energy storage apparatus of the electronic device 10. For example, the load 30 may be a battery. In an embodiment, the load 30 may be an external device of the electronic device 10. For example, the load 30 may be a display, a keyboard, or the like.

The structures and functions of the wireless charging module 20 and the control circuit for the wireless charging module 20 provided in this application are described below in detail with reference to FIG. 4 to FIG. 13.

Figure 4:
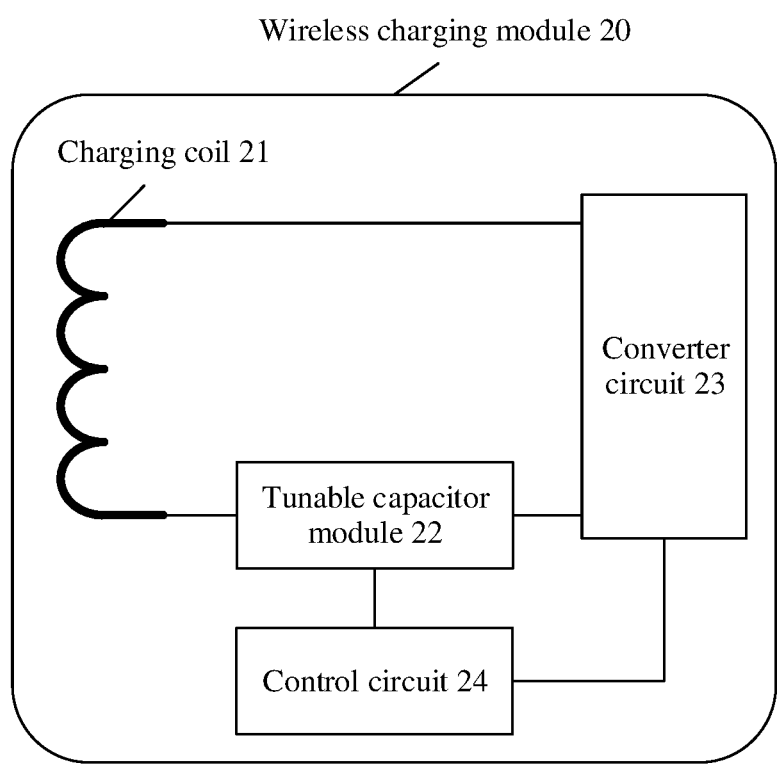
FIG. 4 is a schematic diagram of a structure of a wireless charging module according to this application.

FIG. 4 is a schematic diagram of a structure of a wireless charging module according to this application. As shown in FIG. 4, the wireless charging module 20 includes a charging coil 21, a tunable capacitor module 22, a converter circuit 23, and a control circuit 24. The converter circuit 23 includes at least one of a rectifier circuit 231 and an inverter circuit 232. Specifically, the converter circuit 23 includes the rectifier circuit 231 and the inverter circuit 232. Alternatively, the converter circuit 23 includes the rectifier circuit 231. Alternatively, the converter circuit 23 includes the inverter circuit 232. The tunable capacitor module 22 is connected in series between the charging coil 21 and the converter circuit 23.

The tunable capacitor module 22 includes a plurality of capacitors and at least one controllable switch. In embodiments of this application, an equivalent capacitance value of the tunable capacitor module 22 includes a plurality of selectable capacitance values. In an embodiment, the equivalent capacitance value of the tunable capacitor module 22 includes at least a first capacitance value c1 and a second capacitance value c2. The second capacitance value c2 is greater than the first capacitance value c1.

The control circuit 24 is configured to control the equivalent capacitance value of the tunable capacitor module 22. Specifically, the control circuit 24 is configured to control at least one controllable switch of the tunable capacitor module 22 to be turned on or off, to control the equivalent capacitance value of the tunable capacitor module 22.

In an embodiment, when the wireless charging module 20 is configured to receive the alternating magnetic field provided by the wireless power supply device 40 and output the direct current Ud1, the control circuit 24 controls the equivalent capacitance value of the tunable capacitor module 22 to be the first capacitance value c1. A resonance frequency of the charging coil 21 and the tunable capacitor module 22 is equal to a working frequency or a preset frequency of the alternating magnetic field provided by the wireless power supply device 40. Correspondingly, the wireless charging module 20 works in a resonant or approximately resonant state, so that charging efficiency of the wireless charging module 20 is improved and a charging loss of the wireless charging module 20 is reduced. In embodiments of this application, the preset frequency is selected by comprehensively considering factors such as the charging efficiency and EMC in an allowed frequency range. From a perspective of charging efficiency, the charging loss of the wireless charging module 20 at the preset frequency is the smallest.

In an embodiment, when the wireless charging module 20 is configured to receive the alternating magnetic field provided by the wireless power supply device 40 and output the direct current Ud1, the control circuit 24 controls the equivalent capacitance value of the tunable capacitor module 22 to be the second capacitance value c2. The resonance frequency of the charging coil 21 and the tunable capacitor module 22 is less than a minimum working frequency of the alternating magnetic field provided by the wireless power supply device 40. Correspondingly, the wireless charging module 20 works in a bias inductive state.

In an embodiment, when the wireless charging module 20 is configured to receive the direct current Ud2 and transmit the alternating magnetic field, the control circuit 24 controls the equivalent capacitance value of the tunable capacitor module 22 to be the first capacitance value c1. The resonance frequency of the charging coil 21 and the tunable capacitor module 22 is equal to a working frequency of the inverter circuit 232 of the wireless charging module 20. Correspondingly, the wireless charging module 20 works in a resonant or approximately resonant state, so that charging efficiency of the wireless charging module 20 is improved and a charging loss of the wireless charging module 20 is reduced.

In an embodiment, when the wireless charging module 20 is configured to receive the direct current Ud2 and transmit the alternating magnetic field, the control circuit 24 controls the equivalent capacitance value of the tunable capacitor module 22 to be the second capacitance value c2. The resonance frequency of the charging coil 21 and the tunable capacitor module 22 is less than a minimum working frequency of the inverter circuit 232. Correspondingly, the wireless charging module 20 works in the bias inductive state.

According to the wireless charging module 20 and the control circuit 24 of the wireless charging module 20 provided in embodiments of this application, the equivalent capacitance value of the tunable capacitor module 22 may be controlled by using the at least one controllable switch of the tunable capacitor module 22, so that the wireless charging module can adapt to different working scenarios by changing the equivalent capacitance value of the tunable capacitor module 22. The wireless charging module 20 can work in a bias inductive state to ensure compatibility with a conventional constant-voltage frequency-regulation charging mode. The wireless charging module can also work in a resonant or approximately resonant state with high charging efficiency, to reduce a charging loss and improve charging efficiency. Therefore, the wireless charging module 20 provided in this application can perform charging in a more efficient working mode while being compatible with a constant-voltage frequency-regulation charging mode, thereby improving applicability and practicability of a wireless charging technology.

Figure 5:
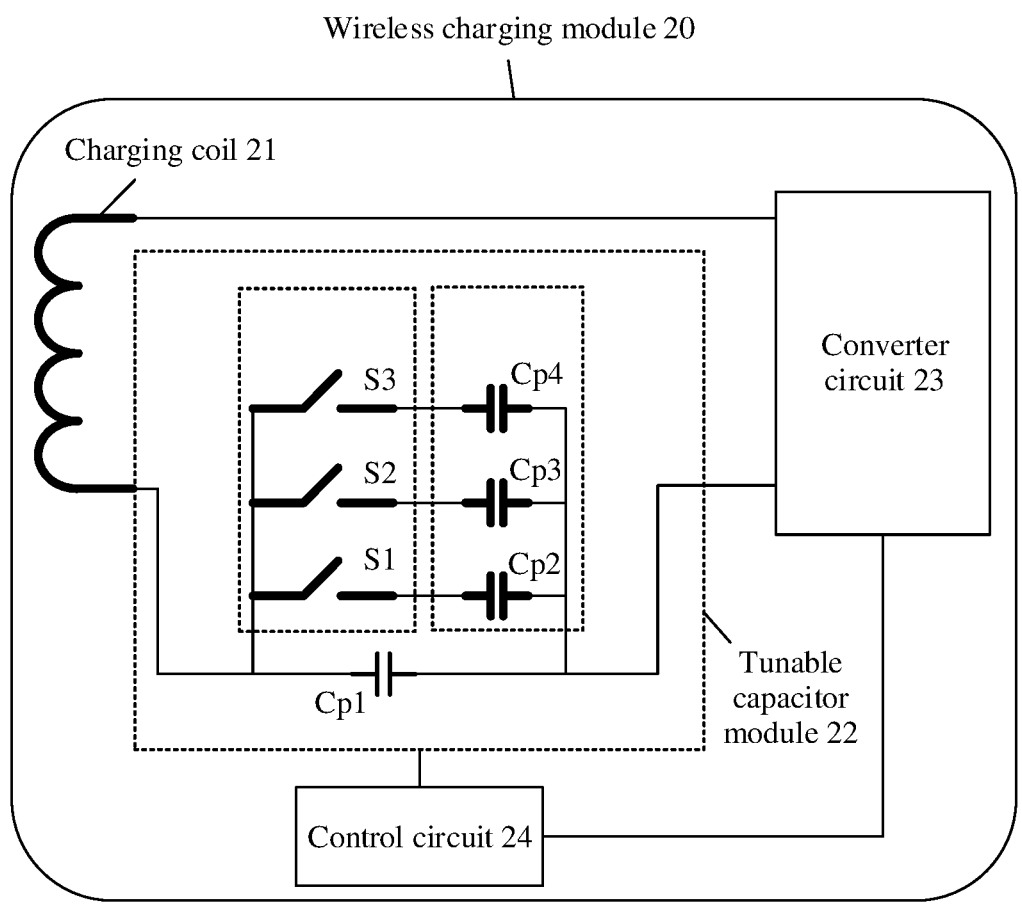
FIG. 5 is another schematic diagram of a structure of a wireless charging module according to this application.

FIG. 5 is another schematic diagram of a structure of a wireless charging module according to this application. As shown in FIG. 5, the tunable capacitor module 22 of the wireless charging module 20 includes a plurality of capacitors and at least one controllable switch. The plurality of capacitors include the first capacitor Cp1 and at least one parallel capacitor. The first capacitor Cp1 is connected in series between the charging coil 21 and the converter circuit 23. The at least one parallel capacitor is respectively connected in parallel to the first capacitor Cp1 by using the at least one controllable switch. Alternatively, each parallel capacitor in the at least one parallel capacitor is connected in series to one controllable switch in the at least one controllable switch, and is connected in series to the first capacitor Cp1.

For example, the at least one parallel capacitor includes a parallel capacitor Cp2, a parallel capacitor Cp3, and a parallel capacitor Cp4. For example, the at least one controllable switch includes a controllable switch S1, a controllable switch S2, and a controllable switch S3. As shown in FIG. 5, the parallel capacitor Cp2 and the controllable switch S1 are connected in series, and are connected in parallel to two ends of the first capacitor Cp1. The parallel capacitor Cp3 and the controllable switch S2 are connected in series, and are connected in parallel to two ends of the first capacitor Cp1. The parallel capacitor Cp4 and the controllable switch S3 are connected in series, and are connected in parallel to two ends of the first capacitor Cp1.

In embodiments of this application, the control circuit 24 is configured to control one or more of the at least one controllable switch of the tunable capacitor module 22 to be turned on or off. In an embodiment, the control circuit 24 controls one or more of the at least one controllable switch of the tunable capacitor module 22 to be turned off, and the equivalent capacitance value of the tunable capacitor module 22 is the first capacitance value c1. The control circuit 24 controls the at least one controllable switch of the tunable capacitor module 22 to be all turned on, and the equivalent capacitance value of the tunable capacitor module 22 is the second capacitance value c2.

As shown in FIG. 5, a capacitance value of the first capacitor Cp1 is equal to the first capacitance value c1, and a capacitance value obtained by connecting the first capacitor Cp1 in parallel to the parallel capacitors Cp2, Cp3, and Cp4 is equal to the second capacitance value c2. For example, the control circuit 24 controls the controllable switch S1, the controllable switch S2, and the controllable switch S3 to be all turned off, and the equivalent capacitance value of the tunable capacitor module 22 is a minimum capacitance value. The control circuit 24 controls the controllable switch S1, the controllable switch S2, and the controllable switch S3 to be all turned on, and the equivalent capacitance value of the tunable capacitor module 22 is a maximum capacitance value. The control circuit 24 controls one or more of the controllable switch S1, the controllable switch S2, and the controllable switch S3 to be turned on, and may control the equivalent capacitance value of the tunable capacitor module 22 to change between the minimum capacitance value and the maximum capacitance value.

In embodiments of this application, the tunable capacitor module 22 includes a first capacitor Cp1, at least one parallel capacitor, and at least one controllable switch connected in series to the at least one parallel capacitor. The tunable capacitor module 22 of the wireless charging module 20 provided in embodiments of this application has a simple structure and low costs. This ensures compatibility of a charging mode of the wireless charging module 20 without significantly increasing costs of the wireless charging module 20.

Figure 6:
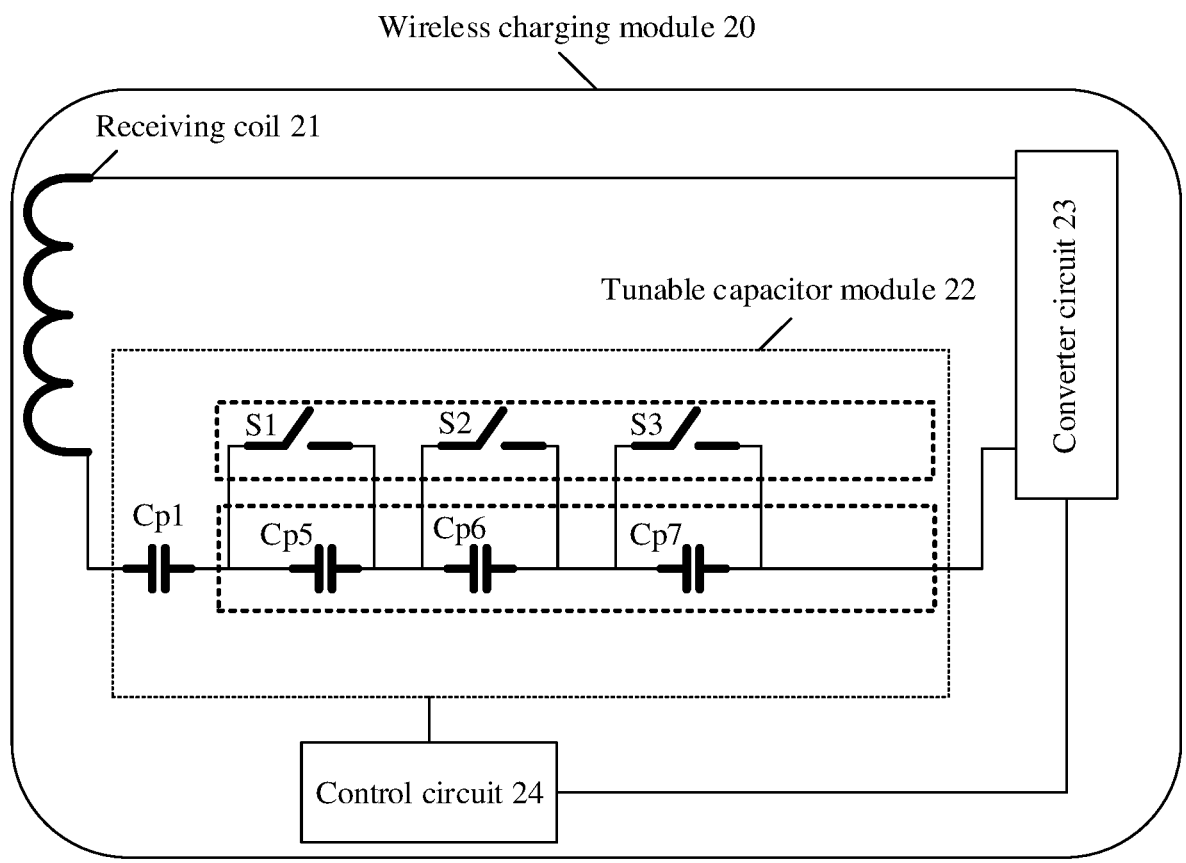
FIG. 6 is another schematic diagram of a structure of a wireless charging module according to this application.

FIG. 6 is another schematic diagram of a structure of a wireless charging module according to this application. As shown in FIG. 6, the tunable capacitor module 22 of the wireless charging module 20 may include a plurality of capacitors and at least one controllable switch. The plurality of capacitors include the first capacitor Cp1 and at least one series capacitor. The first capacitor Cp1 and the at least one series capacitor are connected in series between the charging coil 21 and the converter circuit 23. The at least one series capacitor is separately connected in parallel to the at least one controllable switch. In other words, each controllable switch in the at least one controllable switch is connected in parallel to one series capacitor in the at least one series capacitor.

For example, the at least one series capacitor includes a series capacitor Cp5, a series capacitor Cp6, and a series capacitor Cp7. For example, the at least one controllable switch includes the controllable switch S1, the controllable switch S2, and the controllable switch S3. As shown in FIG. 6, the first capacitor Cp1 is connected in series to the series capacitor Cp5, the series capacitor Cp6, and the series capacitor Cp7, the controllable switch S1 is connected in parallel to the series capacitor Cp5, the controllable switch S2 is connected in parallel to the series capacitor Cp6, and the controllable switch S3 is connected in parallel to the series capacitor Cp7.

In embodiments of this application, the control circuit 24 is configured to control one or more of the at least one controllable switch to be turned off or on. In an embodiment, the control circuit 24 controls one or more of the at least one controllable switch of the tunable capacitor module 22 to be turned off, and the equivalent capacitance value of the tunable capacitor module 22 is the first capacitance value c1. The control circuit 24 controls the at least one controllable switch of the tunable capacitor module 22 to be all turned on, and the equivalent capacitance value of the tunable capacitor module 22 is the second capacitance value c2.

As shown in FIG. 6, the capacitance value of the first capacitor Cp1 is equal to the second capacitance value c2, and a capacitance value obtained by connecting the first capacitor Cp1 in series to the series capacitor Cp5, the series capacitor Cp6, and the series capacitor Cp7 is equal to the first capacitance value c1. The control circuit 24 controls the controllable switch S1, the controllable switch S2, and the controllable switch S3 to be all turned off, and the equivalent capacitance value of the tunable capacitor module 22 is the minimum capacitance value. The control circuit 24 controls the controllable switch S1, the controllable switch S2, and the controllable switch S3 to be all turned on, and the equivalent capacitance value of the tunable capacitor module 22 is the maximum capacitance value. The control circuit 24 controls one or more of the controllable switch S1, the controllable switch S2, and the controllable switch S3 to be turned on, and may control the equivalent capacitance value of the tunable capacitor module 22 to change between the minimum capacitance value and the maximum capacitance value.

In embodiments of this application, the tunable capacitor module 22 includes the first capacitor Cp1, at least one series capacitor, and at least one controllable switch, and one series capacitor is connected in parallel to one controllable switch. The tunable capacitor module 22 of the wireless charging module 20 provided in embodiments of this application bears a low voltage stress, so that the wireless charging module 20 can be applied to a wireless charging scenario with a high voltage and a small current, and applicability of the wireless charging module 20 can be improved.

The electronic device 10 provided in embodiments of this application may be applied to different scenarios. The electronic device 10 may be used as a wireless charging transmitting device, or may be used as a wireless charging receiving device, or may have functions of both the wireless charging transmitting device and the wireless charging receiving device. The structure and function of the wireless charging module 20 are further described below with reference to different application scenarios to which the electronic device 10 is applied.

Figure 7:
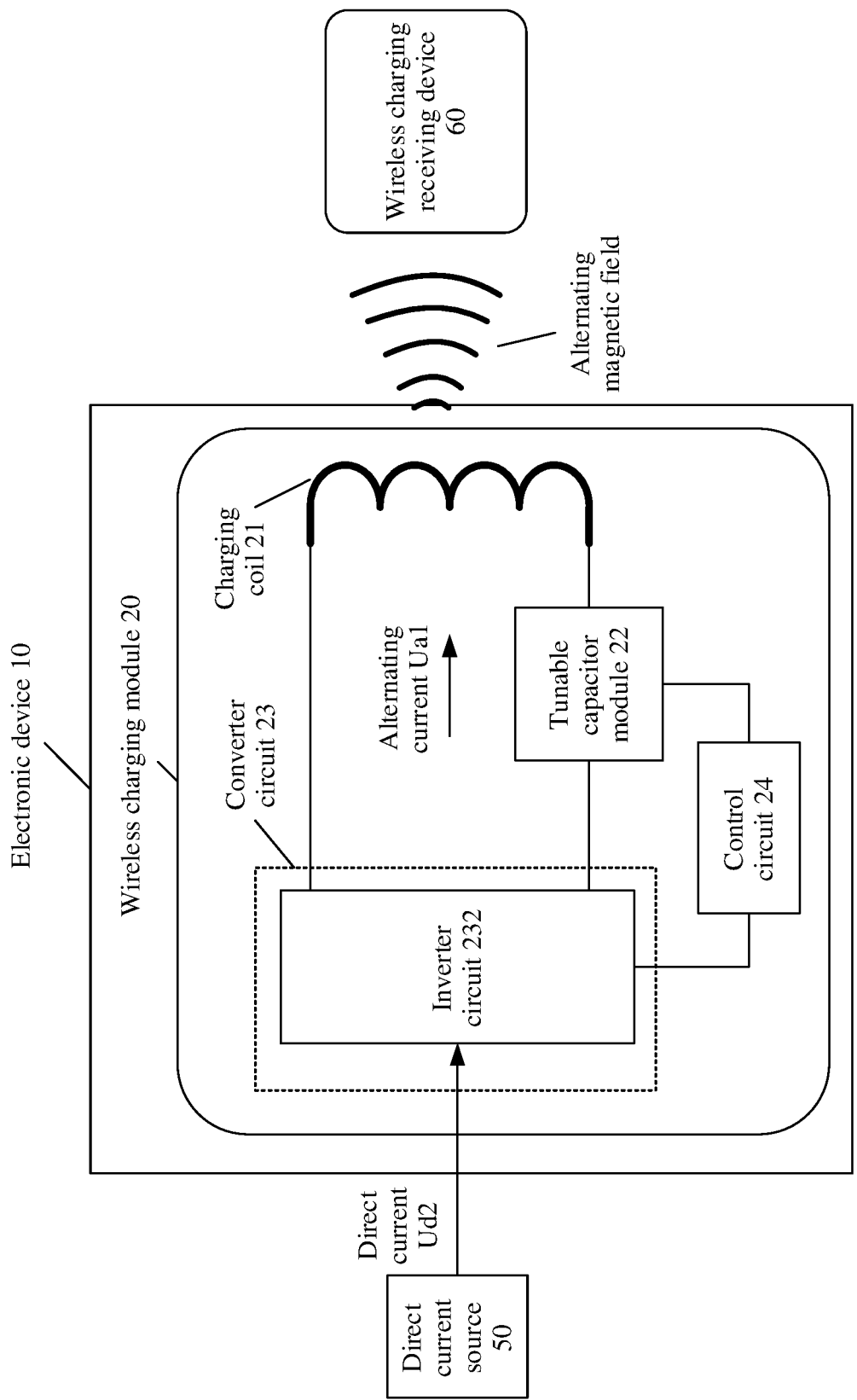
FIG. 7 is a schematic diagram of an application scenario of an electronic device according to this application.

Application Scenario 1:

FIG. 7 is a schematic diagram of an application scenario of an electronic device according to this application. As shown in FIG. 7, the electronic device 10 works as a wireless charging transmitting device. The wireless charging module 20 is configured to: receive the direct current Ud2 provided by the direct current source 50, and transmit the alternating magnetic field to the wireless charging receiving device 60. The converter circuit 23 includes the inverter circuit 232. The inverter circuit 232 has at least two working modes. For example, the inverter circuit 232 may run in a constant-frequency voltage-regulation mode and a constant-voltage frequency-regulation mode. In embodiments of this application, the constant-frequency voltage-regulation mode is a working mode in which the working frequency of the inverter circuit 232 is controlled to be a fixed frequency, and an output power of the inverter circuit 232 is adjusted by changing an input voltage of the inverter circuit 232. In embodiments of this application, the constant-voltage frequency-regulation mode is a working mode in which the input voltage of the inverter circuit 232 is controlled to remain unchanged, and the output power of the inverter circuit 232 is adjusted by changing the working frequency of the inverter circuit 232.

In embodiments of this application, in response to that the inverter circuit 232 runs in the constant-frequency voltage-regulation mode, the control circuit 24 controls one or more controllable switches in the at least one controllable switch of the tunable capacitor module 22 to be turned off. In response to that the inverter circuit 232 runs in the constant-voltage frequency-regulation mode, the control circuit 24 controls the at least one controllable switch of the tunable capacitor module 22 to be all turned on. The control circuit 24 is configured to: determine that a working mode of the inverter circuit 232 is the constant-frequency voltage-regulation mode, and control some controllable switches in the at least one controllable switch of the tunable capacitor module 22 to be turned on and the other controllable switches to be turned off. The equivalent capacitance value of the tunable capacitor module 22 is the first capacitance value c1. A resonance frequency of the tunable capacitor module 22 and the charging coil 21 is equal to the working frequency of the inverter circuit 232, and the wireless charging module 20 works in a charging mode with high charging efficiency and a low charging loss. The control circuit 24 is configured to: determine that the working mode of the inverter circuit 232 is the constant-voltage frequency-regulation mode, and control the at least one controllable switch of the tunable capacitor module 22 to be all turned on. The equivalent capacitance value of the tunable capacitor module 22 is the second capacitance value c2, and the wireless charging module 20 works in a conventional constant-voltage frequency-regulation charging mode. In embodiments of this application, the inverter circuit 232 is configured to: receive the direct current Ud2 provided by the direct current source 50, convert the direct current Ud2 into a corresponding alternating current Ua1, and provide the alternating current Ua1 to the charging coil 21. The charging coil 21 and the tunable capacitor module 22 may be combined to convert the alternating current Ua1 into a corresponding alternating magnetic field, and transmit the corresponding alternating magnetic field to the wireless charging receiving device 60.

For example, the at least one controllable switch includes the controllable switch S1, and the at least one parallel capacitor includes the parallel capacitor Cp2. The value of the first capacitor Cp1 is equal to the first capacitance value c1, and a capacitance value obtained by connecting the first capacitor Cp1 in series to the parallel capacitor Cp2 is equal to the second capacitance value c2. The control circuit 24 is configured to: determine that the inverter circuit 232 works in the constant-frequency voltage-regulation mode, and control the controllable switch S1 to be opened. The equivalent capacitance value of the tunable capacitor module 22 is the first capacitance value c1, and the resonance frequency of the tunable capacitor module 22 and the charging coil 21 is equal to the working frequency of the inverter circuit 232. The control circuit 24 is configured to: determine that the inverter circuit 232 works in the constant-voltage frequency-regulation mode, and control the controllable switch S1 to be turned on. The equivalent capacitance value of the tunable capacitor module 22 is the second capacitance value c2, and the resonance frequency of the tunable capacitor module 22 and the charging coil 21 is less than the minimum working frequency of the inverter circuit 232.

For example, the at least one controllable switch includes the controllable switch S1, the controllable switch S2, and the controllable switch S3. The at least one parallel circuit includes the parallel capacitor Cp2, the parallel capacitor Cp3, and the parallel capacitor Cp4. The control circuit 24 determines that the inverter circuit 232 works in the constant-frequency voltage-regulation mode, and controls one or more of the controllable switch S1, the controllable switch S2, and the controllable switch S3 to be turned on or off to search for the first capacitance value c1. The control circuit 24 may search for the first capacitance value c1 by using a perturbation and observation method.

As shown in FIG. 5 or FIG. 6, the control circuit 24 continuously turns on or off one or more of the controllable switch S1, the controllable switch S2, and the controllable switch S3, to continuously reduce the equivalent capacitance value of the tunable capacitor module 22. After the equivalent capacitance value of the tunable capacitor module 22 is decreased each time, wireless energy transmission efficiency of the wireless charging module 20 is obtained, and it is determined whether the obtained wireless energy transmission efficiency is improved. The control circuit 24 may obtain transmitting power of the wireless charging module 20 and receiving power of the corresponding wireless charging receiving device 60, and calculate the wireless energy transmission efficiency of the wireless charging module 20 based on the obtained transmitting power and receiving power. If the control circuit 24 determines that the equivalent capacitance value of the tunable capacitor module 22 is a capacitance value, and the wireless energy transmission efficiency of the wireless charging module 20 reaches a peak value, the control circuit 24 determines the capacitance value as the first capacitance value c1.

For example, the control circuit 24 controls the controllable switch S1 to be turned off, the controllable switch S2 and the controllable switch S3 to be turned on, and obtains first wireless energy transmission efficiency of the wireless charging module 20. Further, the control circuit 24 controls the controllable switch S1 and the controllable switch S2 to be turned off, controls the controllable switch S3 to be turned on to reduce the equivalent capacitance value of the tunable capacitor module 22, and obtains second wireless energy transmission efficiency of the wireless charging module 20. Further, the control circuit 24 determines, based on the first wireless energy transmission efficiency and the second wireless energy transmission efficiency, whether the wireless energy transmission efficiency of the wireless charging module 20 is improved. If the control circuit 24 determines that the second wireless energy transmission efficiency is not improved compared with the first wireless energy transmission efficiency, the control circuit 24 determines that the first capacitance value c1 is a capacitance value obtained by connecting the first capacitor Cp1 in parallel to the parallel capacitor Cp4. If determining that the second wireless energy transmission efficiency is improved compared with the first wireless energy transmission efficiency, the control circuit 24 continues to reduce the equivalent capacitance value of the tunable capacitor module 22 and continues to determine whether the wireless energy transmission efficiency of the wireless charging module 20 is improved, until the control circuit 24 determines to reduce the equivalent capacitance value of the tunable capacitor module 22, and if the wireless energy transmission efficiency of the wireless charging module 20 is no longer improved, no longer reduces the equivalent capacitance value of the tunable capacitor module 22.

The control circuit 24 is configured to: determine that the inverter circuit 232 works in the constant-voltage frequency-regulation mode, and control the controllable switch S1, the controllable switch S2, and the controllable switch S3 to be all turned on. The equivalent capacitance value of the tunable capacitor module 22 is the second capacitance value c2, and the resonance frequency of the tunable capacitor module 22 and the charging coil 21 is less than the minimum working frequency of the inverter circuit 232.

For example, the at least one controllable switch includes the controllable switch S1, and the at least one series capacitor includes the series capacitor Cp5. The capacitance value obtained by connecting the first capacitor Cp1 in series to the series capacitor Cp5 is equal to the first capacitance value c1, and the capacitance value of the first capacitor Cp1 is the second capacitance value c2. The control circuit 24 is configured to: determine that the inverter circuit 232 works in the constant-frequency voltage-regulation mode, and control the controllable switch S1 to be opened. The equivalent capacitance value of the tunable capacitor module 22 is the first capacitance value c1, and the resonance frequency of the tunable capacitor module 22 and the charging coil 21 is equal to the working frequency of the inverter circuit 232. The control circuit 24 is configured to: determine that the inverter circuit 232 works in the constant-voltage frequency-regulation mode, and control the controllable switch S1 to be turned on. The equivalent capacitance value of the tunable capacitor module 22 is the second capacitance value c2, and the resonance frequency of the tunable capacitor module 22 and the charging coil 21 can be less than the minimum working frequency of the inverter circuit 232.

For example, the at least one controllable switch includes the controllable switch S1, the controllable switch S2, and the controllable switch S3, and the at least one series capacitor includes the series capacitor Cp5, the series capacitor Cp6, and the series capacitor Cp7. The control circuit 24 is configured to: determine that the inverter circuit 232 works in the constant-frequency voltage-regulation mode, and control one or more controllable switches in the controllable switch S1, the controllable switch S2, and the controllable switch S3 to be turned on or off, to search for the first capacitance value c1 that enables the resonance frequency of the tunable capacitor module 22 and the charging coil 21 to be equal to the working frequency of the inverter circuit 232. For example, the control circuit 24 may search for the first capacitance value c1 by using a perturbation and observation method. The control circuit 24 is configured to: determine that the inverter circuit 232 works in the constant-voltage frequency-regulation mode, and control the controllable switch S1, the controllable switch S2, and the controllable switch S3 to be all turned on. The equivalent capacitance value of the tunable capacitor module 22 is the second capacitance value c2, and the resonance frequency of the tunable capacitor module 22 and the charging coil 21 is less than the minimum working frequency of the inverter circuit 232.

In embodiments of this application, the wireless charging module 20 correspondingly adjusts the equivalent capacitance value of the tunable capacitor module 22 based on the working mode of the inverter circuit 232, so that the resonance frequency of the tunable capacitor module 22 and the charging coil 21 is equal to the working frequency of the inverter circuit 232, and the wireless charging module 20 works in a resonant or approximately resonant state with high charging efficiency, thereby reducing a charging loss. Alternatively, the resonance frequency of the tunable capacitor module 22 and the charging coil 21 is less than the minimum working frequency of the inverter circuit 232, so that the tunable capacitor module 22 can work in a bias inductive state in a conventional constant-voltage frequency-regulation charging mode, thereby ensuring compatibility with the constant-voltage frequency-regulation charging mode.

Figure 8:
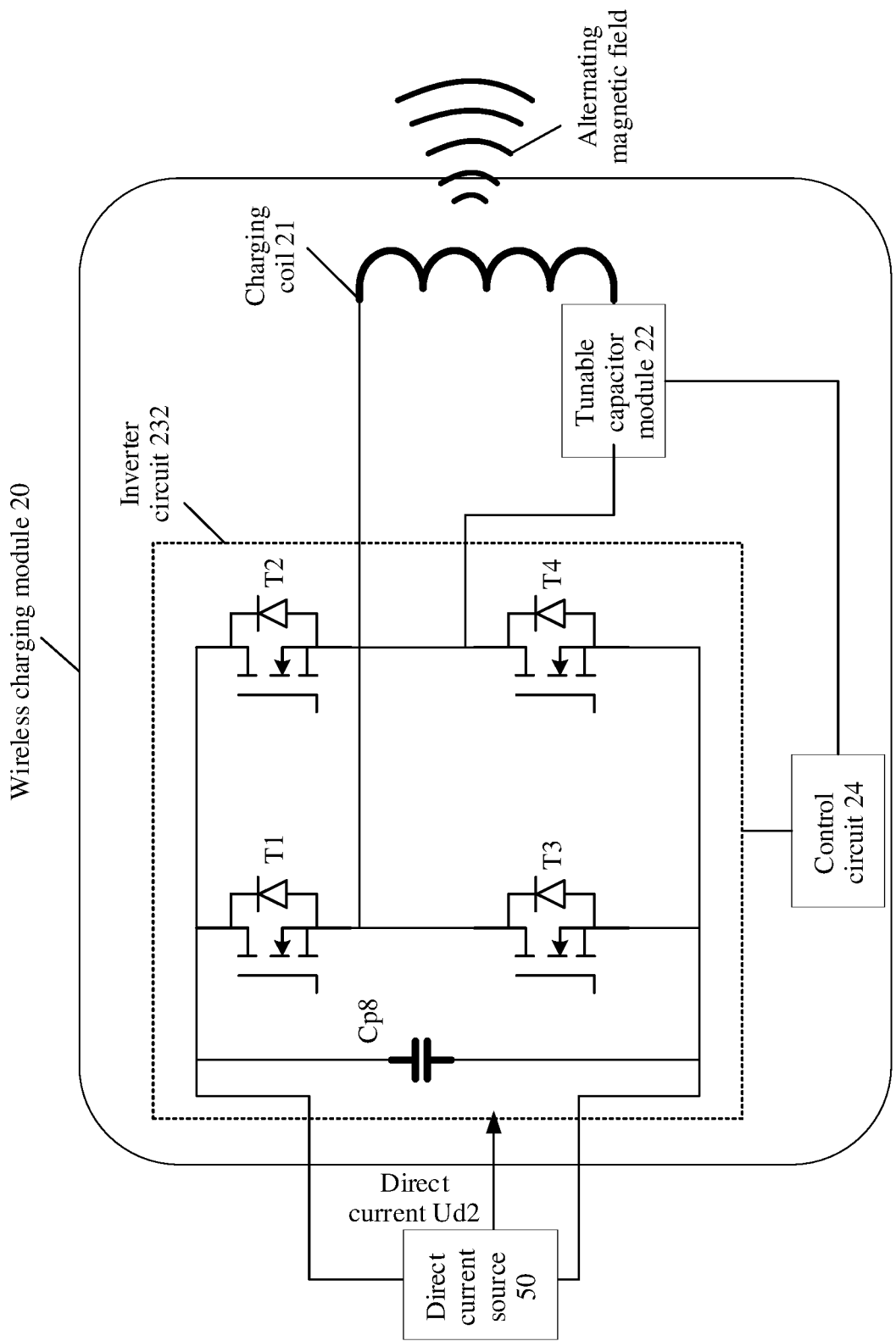
FIG. 8 is another schematic diagram of a structure of a wireless charging module according to this application.

FIG. 8 is another schematic diagram of a structure of a wireless charging module according to this application. As shown in FIG. 8, the inverter circuit 232 includes four switching transistors and one capacitor Cp8. The four switching transistors are respectively a switching transistor T1, a switching transistor T2, a switching transistor T3, and a switching transistor T4. The switching transistor T1 and the switching transistor T3 form a first half bridge of the inverter circuit 232, the switching transistor T1 is used as an upper bridge arm of the first half bridge, and the switching transistor T3 is used as a lower bridge arm of the first half bridge. The switching transistor T2 and the switching transistor T4 form a second half bridge of the inverter circuit 232, the switching transistor T2 is used as an upper bridge arm of the second half bridge, and the switching transistor T4 is used as a lower bridge arm of the second half bridge. The capacitor Cp8 is connected in parallel to two ends of the first half bridge. One end of the charging coil 21 is connected to the first half bridge, and the other end is connected to the second half bridge.

In an embodiment, the control circuit 24 is configured to: determine that the working mode of the inverter circuit 232 is the constant-frequency voltage-regulation mode, control drive signals of the switching transistor T1, the switching transistor T2, the switching transistor T3, and the switching transistor T4 to be fixed at a preset working frequency, and control, by using these drive signals with a fixed frequency, both the upper bridge arm of the first half bridge and the lower bridge arm of the second half bridge and both the lower bridge arm of the first half bridge and the upper bridge arm of the second half bridge to be alternately turned on or off, to implement an inversion function. In an embodiment, the control circuit 24 is further configured to control, based on the output power required by the wireless charging receiving device 60, a voltage of the direct current Ud2 provided by the direct current source 50, to adjust the output power of the inverter circuit 232.

In an embodiment, the control circuit 24 is configured to: determine that the working mode of the inverter circuit 232 is the constant-voltage frequency-regulation mode, keep a voltage of the direct current Ud2 provided by the direct current source 50 unchanged, and control, by using a drive signal with a variable frequency, both the upper bridge arm of the first half bridge and the lower bridge arm of the second half bridge and both the lower bridge arm of the first half bridge and the upper bridge arm of the second half bridge to be alternately turned on or off, to implement an inversion function. In an embodiment, the control circuit 24 is further configured to adjust a frequency of a drive signal of each bridge arm based on the output power required by the wireless charging receiving device 60, to adjust the output power of the inverter circuit 232.

In embodiments of this application, the switching transistor included in the inverter circuit 232 may be specifically a power transistor, a power field effect transistor, or the like. A type of the switching transistor is not specifically limited in this application. In addition, the description of the structure of the inverter circuit 232 is merely an example. The inverter circuit 232 may use another possible circuit structure. This is not limited in this application either.

Figure 9:
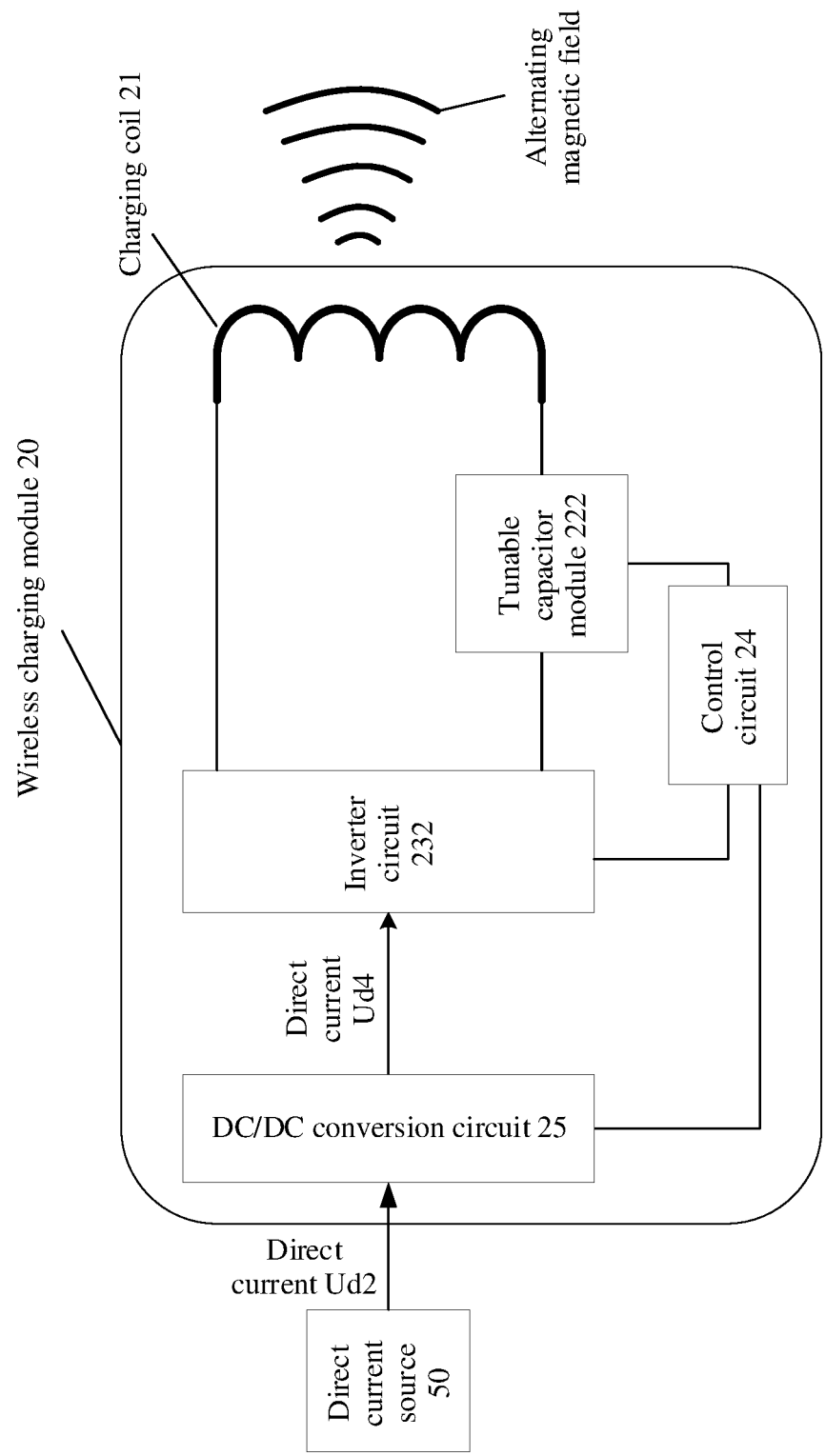
FIG. 9 is another schematic diagram of a structure of a wireless charging module according to this application.

FIG. 9 is another schematic diagram of a structure of a wireless charging module according to this application. As shown in FIG. 9, the wireless charging module 20 further includes a DC/DC conversion circuit 25. The DC/DC conversion circuit 25 is connected to the direct current source 50, the inverter circuit 232, and the control circuit 24. The control circuit 24 is further configured to: control the DC/DC conversion circuit 25 to convert the direct current Ud2 provided by the direct current source 50 into a direct current Ud4 of a target voltage required by the inverter circuit 232, and output the direct current Ud4 to the inverter circuit 232. For example, the DC/DC conversion circuit 25 may include an asymmetrical half-bridge (AHB) conversion circuit, an active clamp flyback (ACF) conversion circuit, a buck circuit, a buck-boost circuit, and the like. A type of the DC/DC conversion circuit 25 is not specifically limited in this application.

In embodiments of this application, the wireless charging module 20 further includes the DC/DC conversion circuit 25. The wireless charging module 20 converts, by using the DC/DC conversion circuit 25, the direct current Ud2 provided by the direct current source 50 into the direct current Ud4 of the voltage required by the inverter circuit 232. In this way, adaptability of the wireless charging module 20 to the direct current source 50 can be improved.

Application Scenario 2

Figure 10:
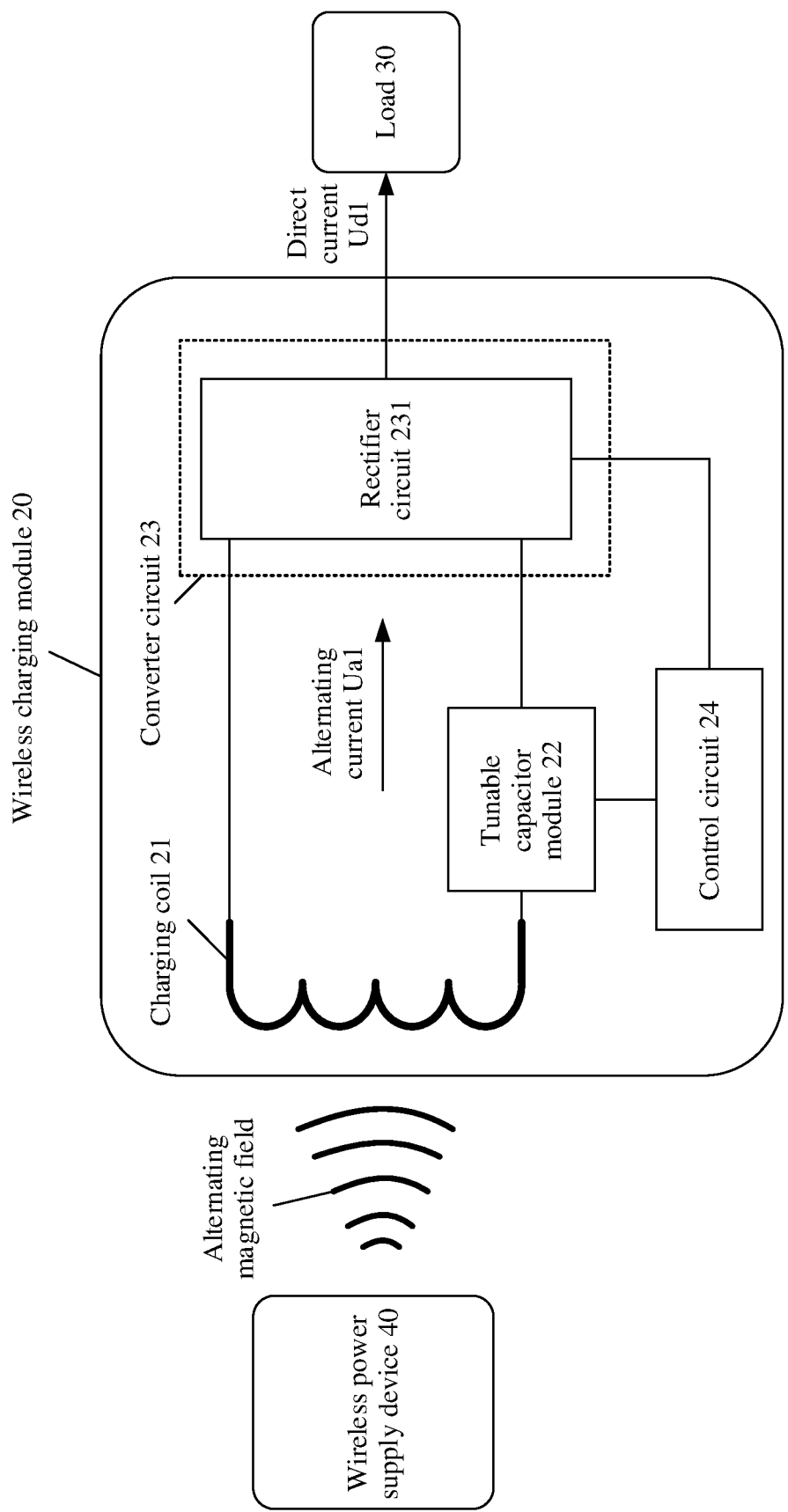
FIG. 10 is a schematic diagram of another application scenario of an electronic device according to this application.

FIG. 10 is a schematic diagram of another application scenario of an electronic device according to this application. As shown in FIG. 10, the electronic device 10 works as a wireless charging receiving device. The wireless charging module 20 is configured to: receive the alternating magnetic field provided by the wireless power supply device 40, and provide the direct current Ud1 to the load 30. The converter circuit 23 includes the rectifier circuit 231. The wireless power supply device 40 may run in a constant-frequency voltage-regulation mode or a constant-voltage frequency-regulation mode. In other words, the inverter circuit of the wireless power supply device 40 may run in the constant-frequency voltage-regulation mode or the constant-voltage frequency-regulation mode.

In embodiments of this application, in response to that the wireless power supply device 40 runs in the constant-frequency voltage-regulation mode, the control circuit 24 controls one or more controllable switches in the at least one controllable switch of the tunable capacitor module 22 to be turned off. In response to that the wireless power supply device 40 runs in the constant-voltage frequency-regulation mode, the control circuit 24 controls the at least one controllable switch of the tunable capacitor module 22 to be all turned on. In an embodiment, the control circuit 24 is configured to: determine that a working mode of the inverter circuit of the wireless power supply device 40 is the constant-frequency voltage-regulation mode, and control some controllable switches in the at least one controllable switch of the tunable capacitor module 22 to be turned on and the other controllable switches to be turned off. The equivalent capacitance value of the tunable capacitor module 22 is the first capacitance value c1, and the resonance frequency of the tunable capacitor module 22 and the charging coil 21 is equal to the working frequency or the preset frequency of the alternating magnetic field provided by the wireless power supply device 40. In an embodiment, the control circuit 24 is configured to: determine that the working mode of the inverter circuit of the wireless power supply device 40 is the constant-voltage frequency-regulation mode, and control the at least one controllable switch of the tunable capacitor module 22 to be all turned on. The equivalent capacitance value of the tunable capacitor module 22 is the second capacitance value c2, and the resonance frequency of the tunable capacitor module 22 and the charging coil 21 is less than the minimum working frequency of the alternating magnetic field provided by the wireless power supply device 40. The charging coil 21 and the tunable capacitor module 22 may be combined to convert the alternating magnetic field provided by the wireless power supply device 40 into the corresponding alternating current Ua1, and output the alternating current Ua1 to the rectifier circuit 231. The control circuit 24 is configured to: control the rectifier circuit 231 to convert an alternating current Ua2 into the corresponding direct current Ud1, and provide the direct current Ud1 to the load 30.

For example, the at least one controllable switch includes the controllable switch S1, and the at least one parallel capacitor includes the parallel capacitor Cp2. The value of the first capacitor Cp1 is equal to the first capacitance value c1, and a capacitance value obtained by connecting the first capacitor Cp1 in parallel to the parallel capacitor Cp2 is the second capacitance value c2. The control circuit 24 is configured to: determine that the wireless power supply device 40 works in the constant-frequency voltage-regulation mode, and control the controllable switch S1 to be opened. The equivalent capacitance value of the tunable capacitor module 22 is the first capacitance value c1, and the resonance frequency of the tunable capacitor module 22 and the charging coil 21 is equal to the working frequency or the preset frequency of the alternating magnetic field provided by the wireless power supply device 40. The control circuit 24 is configured to: determine that the wireless power supply device 40 works in the constant-voltage frequency-regulation mode, and control the controllable switch S1 to be turned on. The equivalent capacitance value of the tunable capacitor module 22 is the second capacitance value c2, and the resonance frequency of the tunable capacitor module 22 and the charging coil 21 is less than the minimum working frequency of the alternating magnetic field provided by the wireless power supply device 40.

For example, the at least one controllable switch includes the controllable switch S1, the controllable switch S2, and the controllable switch S3, and the at least one parallel capacitor includes the parallel capacitor Cp2, the parallel capacitor Cp3, and the parallel capacitor Cp4. The control circuit 24 is configured to: when it is determined that the wireless power supply device 40 works in the constant-frequency voltage-regulation mode, control one or more of the controllable switch S1, the controllable switch S2, and the controllable switch S3 to be turned off, to search for the first capacitance value c1 that enables the resonance frequency of the tunable capacitor module 22 and the charging coil 21 to be equal to the working frequency or the preset frequency of the alternating magnetic field provided by the wireless power supply device 40. The control circuit 24 may search for the first capacitance value c1 by using a perturbation and observation method.

As shown in FIG. 5 or FIG. 6, the control circuit 24 may continuously turn on or off one or more of the controllable switch S1, the controllable switch S2, and the controllable switch S3, to continuously reduce the equivalent capacitance value of the tunable capacitor module 22. After the equivalent capacitance value of the tunable capacitor module 22 is decreased each time, wireless energy transmission efficiency of the wireless charging module 20 is obtained, and it is determined whether the obtained wireless energy transmission efficiency is improved. The control circuit 24 may obtain a transmitting power of the wireless power supply device 40 and a receiving power of the wireless charging module 20, and calculate the wireless energy transmission efficiency based on the transmitting power and the receiving power. If the control circuit 24 determines that the equivalent capacitance value of the tunable capacitor module 22 is a capacitance value, and the wireless energy transmission efficiency of the wireless charging module 20 reaches a peak value, the control circuit 24 determines the capacitance value as the first capacitance value c1.

For example, the control circuit 24 controls the controllable switch S1 to be turned off, the controllable switch S2 and the controllable switch S3 to be turned on, and obtains the first wireless energy transmission efficiency of the wireless charging module 20. Further, the control circuit 24 controls the controllable switch S1 and the controllable switch S2 to be turned off, controls the controllable switch S3 to be turned on to reduce the equivalent capacitance value of the tunable capacitor module 22, and obtains the second wireless energy transmission efficiency of the wireless charging module 20. Further, the control circuit 24 determines, based on the first wireless energy transmission efficiency and the second wireless energy transmission efficiency, whether the wireless energy transmission efficiency of the wireless charging module 20 is improved. If the control circuit 24 determines that the second wireless energy transmission efficiency is not improved compared with the first wireless energy transmission efficiency, the control circuit 24 determines that the first capacitance value c1 is a capacitance value obtained by connecting the first capacitor Cp1 in parallel to the parallel capacitor Cp4. If determining that the second wireless energy transmission efficiency is improved compared with the first wireless energy transmission efficiency, the control circuit 24 controls the equivalent capacitance value of the tunable capacitor module 22 to continue to reduce, and continues to determine whether the wireless energy transmission efficiency of the wireless charging module 20 is improved, until the control circuit 24 determines to reduce the equivalent capacitance value of the tunable capacitor module 22, and if the wireless energy transmission efficiency of the wireless charging module 20 is no longer improved, no longer reduces the equivalent capacitance value of the tunable capacitor module 22.

The control circuit 24 is configured to: determine that the wireless power supply device 40 works in the constant-voltage frequency-regulation mode, and control the controllable switch S1, the controllable switch S2, and the controllable switch S3 to be all turned on. The equivalent capacitance value of the tunable capacitor module 22 is the second capacitance value c2, and the resonance frequency of the tunable capacitor module 22 and the charging coil 21 is less than the minimum working frequency of the alternating magnetic field provided by the wireless power supply device 40.

For example, the at least one controllable switch includes the controllable switch S1, and the at least one series capacitor includes the series capacitor Cp5. The capacitance value obtained by connecting the first capacitor Cp1 in series to the series capacitor Cp5 is equal to the first capacitance value c1, and the capacitance value of the first capacitor Cp1 is the second capacitance value c2. The control circuit 24 is configured to: determine that the wireless power supply device 40 works in the constant-frequency voltage-regulation mode, and control the controllable switch S1 to be opened. The equivalent capacitance value of the tunable capacitor module 22 is the first capacitance value c1, and the resonance frequency of the tunable capacitor module 22 and the charging coil 21 is equal to the working frequency or the preset frequency of the alternating magnetic field provided by the wireless power supply device 40. The control circuit 24 is configured to: determine that the wireless power supply device 40 works in the constant-voltage frequency-regulation mode, and control the controllable switch S1 to be turned on. The equivalent capacitance value of the tunable capacitor module 22 is the second capacitance value c2, and the resonance frequency of the tunable capacitor module 22 and the charging coil 21 is less than the minimum working frequency of the alternating magnetic field provided by the wireless power supply device 40.

For example, the at least one controllable switch includes the controllable switch S1, the controllable switch S2, and the controllable switch S3, and the at least one series capacitor includes the series capacitor Cp5, the series capacitor Cp6, and the series capacitor Cp7. The control circuit 24 is configured to: when it is determined that the wireless power supply device 40 works in the constant-frequency voltage-regulation mode, control one or more of the controllable switch S1, the controllable switch S2, and the controllable switch S3 to be turned on or off, to search for the first capacitance value c1 that enables the resonance frequency of the tunable capacitor module 22 and the charging coil 21 to be equal to the working frequency or the preset frequency of the alternating magnetic field provided by the wireless power supply device 40. The control circuit 24 is configured to: determine that the wireless power supply device 40 works in the constant-voltage frequency-regulation mode, and control the plurality of controllable switches to be all turned on. The equivalent capacitance value of the tunable capacitor module 22 is the second capacitance value c2, and the resonance frequency of the tunable capacitor module 22 and the charging coil 21 can be less than the minimum working frequency of the alternating magnetic field provided by the wireless power supply device 40.

In embodiments of this application, the wireless charging module 20 correspondingly adjusts the equivalent capacitance value of the tunable capacitor module 22 based on a working mode of the wireless power supply device 40, so that the resonance frequency of the tunable capacitor module 22 and the charging coil 21 is equal to the working frequency of the alternating magnetic field provided by the wireless power supply device 40, or is less than the minimum working frequency of the alternating magnetic field provided by the wireless power supply device 40. In this way, the wireless charging module 20 can work in a resonant or approximately resonant state with high charging efficiency and can also work in a bias inductive state in a conventional constant-voltage frequency-regulation charging mode.

In an embodiment, the rectifier circuit 231 is a bridge rectifier circuit. The control circuit 24 is further configured to control, based on an induced voltage of the charging coil 21, the rectifier circuit 231 to run in a half-bridge voltage-multiplying rectification mode or a full-bridge rectification mode. Specifically, in response to that the induced voltage of the charging coil 21 is less than or equal to the preset voltage, the control circuit 24 controls the rectifier circuit 231 to run in the half-bridge voltage-multiplying rectification mode, so that the voltage of the direct current Ud1 outputted by the rectifier circuit 231 is greater than the induced voltage of the charging coil 21, thereby implementing boost rectification. In response to that the induced voltage of the charging coil 21 is greater than the preset voltage, the control circuit 24 controls the rectifier circuit 231 to run in the full-bridge rectification mode, so that the voltage of the direct current Ud1 outputted by the rectifier circuit 231 can be kept at a magnitude of the induced voltage of the charging coil 21, thereby implementing 1-time voltage rectification.

In embodiments of this application, the control circuit 24 is further configured to control, based on the induced voltage of the charging coil 21, the rectifier circuit 231 to run in the half-bridge voltage-multiplying rectification mode or the full-bridge rectification mode, to control a voltage magnitude of the direct current Ud1 provided by the rectifier circuit 231 to the load 30. In this way, adaptability of the wireless charging module 20 to the load 30 and the wireless power supply device 40 can be improved.

Figure 11:
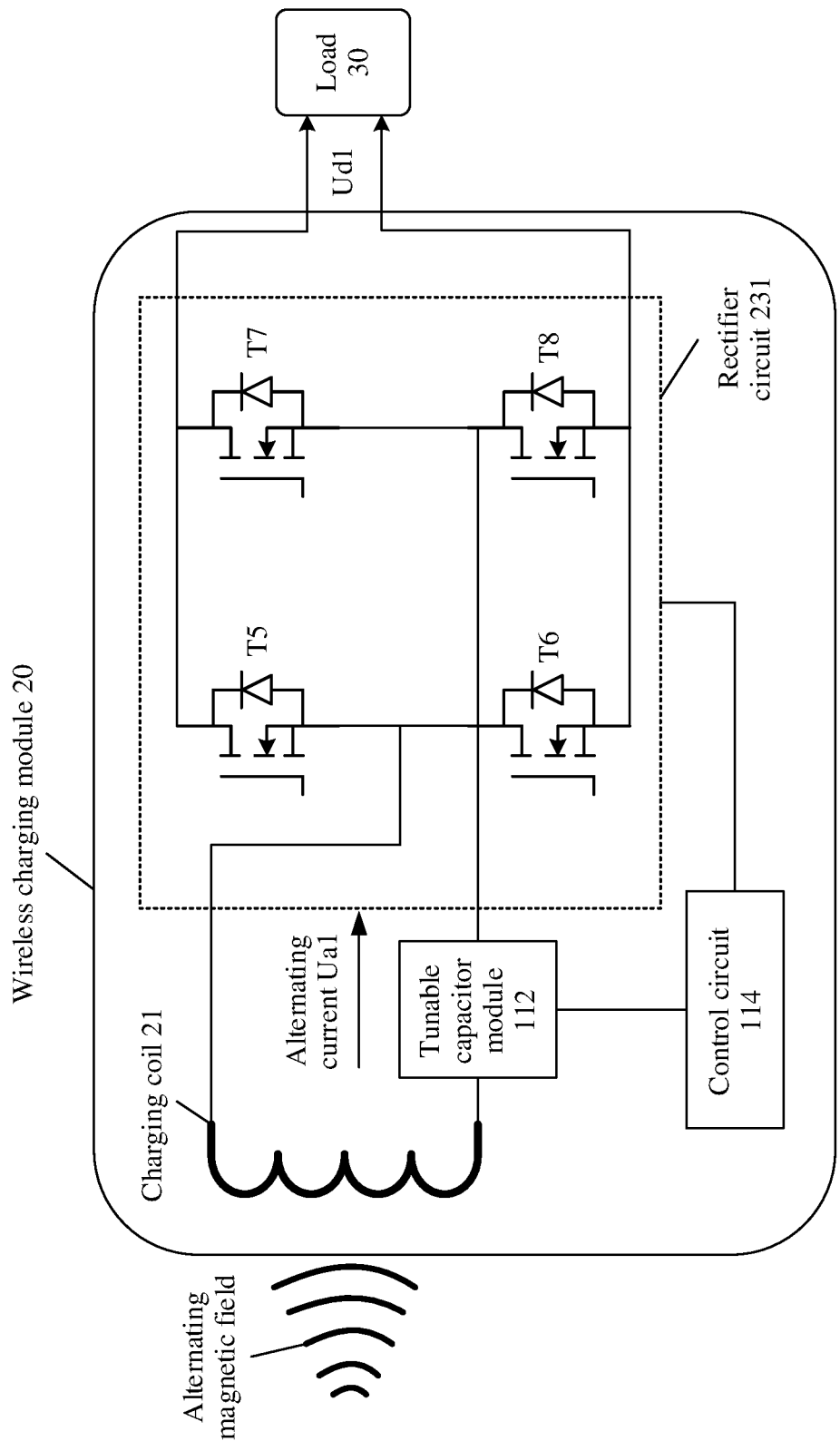
FIG. 11 is another schematic diagram of a structure of a wireless charging module according to this application.

FIG. 11 is another schematic diagram of a structure of a wireless charging module according to this application. As shown in FIG. 11, the rectifier circuit 231 is a full-bridge controllable rectifier circuit. The rectifier circuit 231 may include four switching transistors: a switching transistor T5, a switching transistor T6, a switching transistor T7, and a switching transistor T8. The switching transistor T5 and the switching transistor T6 form a first half bridge of the rectifier circuit 231, the switching transistor T5 is used as an upper bridge arm of the first half bridge, and the switching transistor T6 is used as a lower bridge arm of the first half bridge. The switching transistor T7 and the switching transistor T8 form a second half bridge of the rectifier circuit 231, the switching transistor T7 is used as an upper bridge arm of the second half bridge, and the switching transistor T8 is used as a lower bridge arm of the second half bridge. One end of the wireless charging coil 21 is connected to the first half bridge, and the other end is connected to the second half bridge. Control terminals of the switching transistor T5, the switching transistor T6, the switching transistor T7, and the switching transistor T8 are connected to the control circuit 24.

In embodiments of this application, the control circuit 24 is configured to: determine that the induced voltage of the charging coil 21 is less than or equal to the preset voltage, and control the upper bridge arm and the lower bridge arm of the first half bridge of the rectifier circuit 231 to be alternately turned on or off, so that the upper bridge arm of the second half bridge of the rectifier circuit 231 is turned on, the lower bridge arm of the second half bridge is turned off, or the upper bridge arm of the second half bridge is turned off, and the lower bridge arm of the second half bridge is turned on, so that the rectifier circuit 231 runs in a half-bridge voltage-multiplying rectification mode. For example, the control circuit 24 is configured to: control, at a moment t1, the switching transistor T5 to be turned on and the switching transistor T6 to be turned off, and control, at a moment t2 following the moment t1, the switching transistor T5 to be turned off and the switching transistor T6 to be turned on. This process is repeated. In addition, the switching transistor T7 is controlled to be always on, and the switching transistor T8 is always off. In this way, the rectifier circuit 231 can run in the half-bridge voltage-multiplying rectification mode. The control circuit 24 is configured to: determine that the induced voltage of the charging coil 21 is greater than the preset voltage, and control both the upper bridge arm of the first half bridge and the lower bridge arm of the second half bridge of the rectifier circuit 231 and both the lower bridge arm of the first half bridge and the upper bridge arm of the second half bridge of the rectifier circuit 231 to be alternately turned on or off, so that the rectifier circuit 231 runs in the full-bridge rectification mode. For example, the control circuit 24 is configured to: control, at the moment t1, the switching transistor T5 and the switching transistor T8 to be turned on, and the switching transistor T6 and the switching transistor T7 to be turned off, and control, at the moment t2 following the moment t1, the switching transistor T5 and the switching transistor T8 to be turned off, and the switching transistor T6 and the switching transistor T7 to be turned on. This process is repeated. In this way, the rectifier circuit 231 can run in the full-bridge rectification mode.

In embodiments of this application, the rectifier circuit 231 may alternatively be a bridge half-controlled or single-arm controllable rectifier circuit, and two or three bridge arms of the rectifier circuit 231 may include uncontrollable diodes. The control circuit 24 is configured to enable the rectifier circuit 231 to run in the half-bridge voltage-multiplying rectification mode or the full-bridge rectification mode by controlling switching transistors of the remaining bridge arms.

In embodiments of this application, the switching transistor of the rectifier circuit 231 may be specifically a thyristor that can be turned off, a power transistor, a power field effect transistor, or the like. A type of the switching transistor is not specifically limited in this application.

In embodiments of this application, the rectifier circuit 231 of the wireless charging module 20 is a full-bridge controllable rectifier circuit or a half-bridge controllable rectifier circuit, and complexity of the structure and control of the rectifier circuit 231 is reduced.

Figure 12:
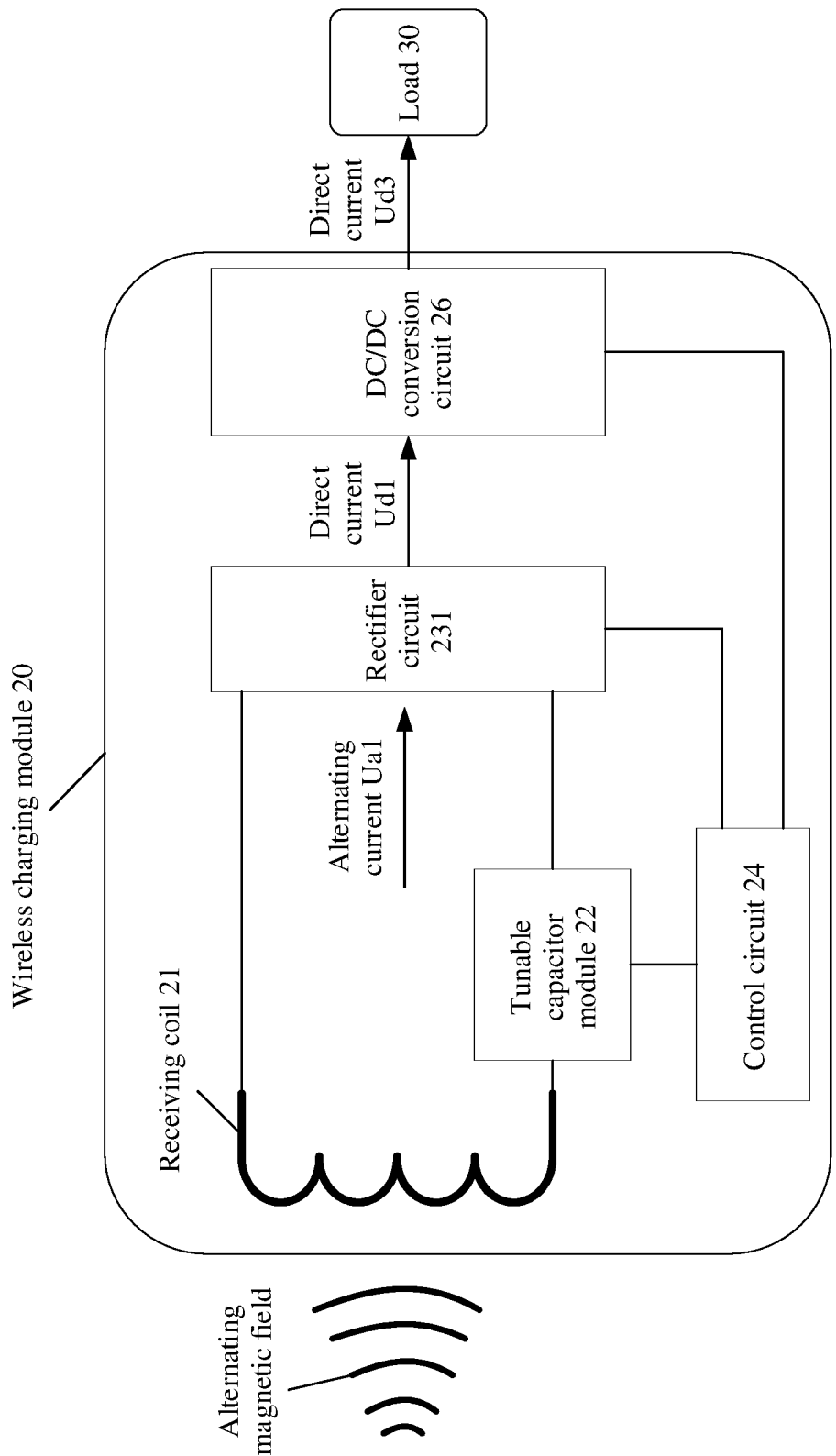
FIG. 12 is another schematic diagram of a structure of a wireless charging module according to this application.

FIG. 12 is another schematic diagram of a structure of a wireless charging module according to this application. As shown in FIG. 12, the wireless charging module 20 further includes a DC/DC conversion circuit 26. The DC/DC conversion circuit 26 is connected to the rectifier circuit 231, the load 30, and the control circuit 24. The control circuit 24 is configured to: control the DC/DC conversion circuit 26 to convert the direct current $Ud1$ outputted by the rectifier circuit 231 into a direct current $Ud3$ of a preset target voltage, and output the direct current $Ud3$ to the load 30. For example, the DC/DC conversion circuit 26 may include an asymmetrical half-bridge (AHB) conversion circuit, an active clamp flyback (ACF) conversion circuit, a buck circuit, a buck-boost circuit, and the like. A type of the DC/DC conversion circuit 26 is not specifically limited in this application.

In embodiments of this application, the wireless charging module 20 further includes the DC/DC conversion circuit 26. The wireless charging module 20 converts, by using the DC/DC conversion circuit 26, the direct current $Ud1$ outputted by the rectifier circuit 231 into the direct current $Ud3$ of the preset voltage. In this way, an adjustment range of an output voltage of the wireless charging module 20 can be further extended, thereby improving adaptability of the wireless charging module 20 to the load 30.

Application Scenario 3

Figure 13:
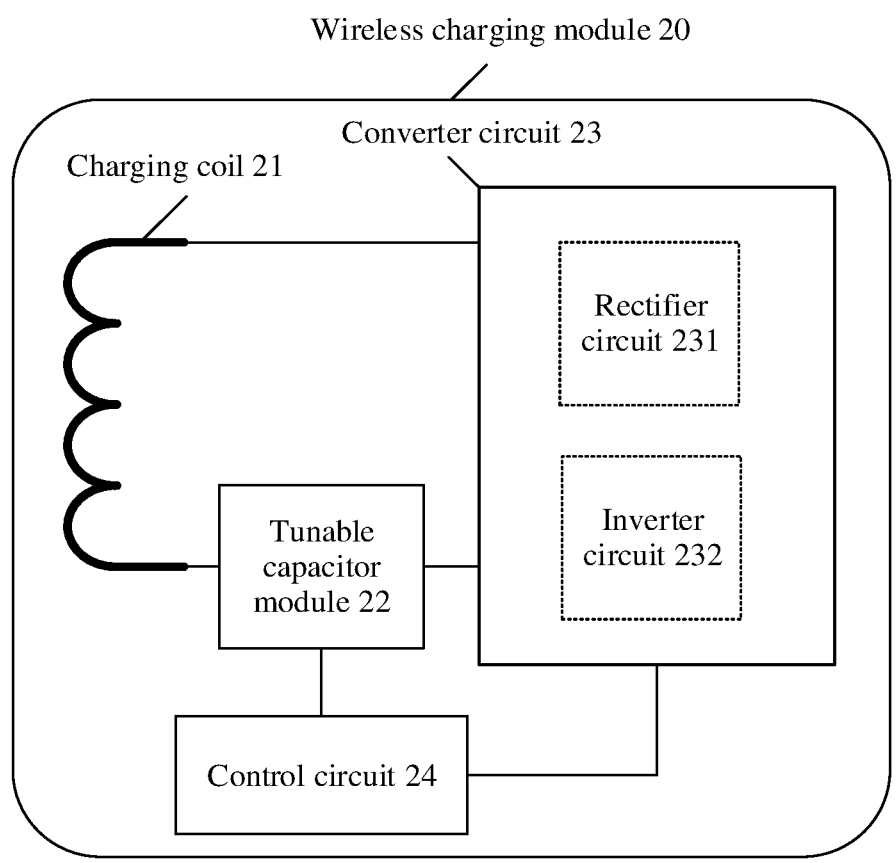
FIG. 13 is another schematic diagram of a structure of a wireless charging module according to this application.

The electronic device 10 may work as a wireless charging receiving device, or may work as a wireless charging transmitting device, and a working mode of the electronic device 10 may be controlled according to an actual requirement. FIG. 13 is another schematic diagram of a structure of a wireless charging module according to this application. As shown in FIG. 13, the converter circuit 23 of the wireless charging module 20 includes the rectifier circuit 231 and the inverter circuit 232. The electronic device 10 works as a wireless charging receiving device, and the control circuit 24 may enable the rectifier circuit 231. When the control circuit 24 starts the rectifier circuit 231, the structure and function of the wireless charging module 20 are the same as those of the wireless charging module 20 described in Application scenario 2. To avoid repetition, details are not described herein again. The electronic device 10 works as a wireless charging transmitting device, and the control circuit 24 may enable the inverter circuit 232. When the control circuit 24 starts the inverter circuit 232, a specific structure and function of the wireless charging module 20 are the same as the structure and function of the wireless charging module 20 described in Application Scenario 1. To avoid repetition, details are not described herein again.

In embodiments of this application, the controllable switch included in the wireless charging module 20 may be specifically a mechanical switch, a controllable switching transistor, or another form of electronic component that can be turned on or off by the control circuit 24. A specific type of the controllable switch is not limited in this application. For example, the controllable switching transistor may be a turn-off thyristor, a power transistor, a power field effect transistor, or the like.

In embodiments of this application, the control circuit 24 may be specifically a device having a data processing and control function in any form, for example, a CPU, a general-purpose processor, a DSP, an ASIC, an FPGA or another programmable logic device, a transistor logic device, a hardware component, or any combination thereof.

In embodiments of this application, different feasible implementations may be used in combination. For example, an implementation solution of the inverter circuit 232 described with reference to FIG. 8 and an implementation of the wireless charging module 20 shown in FIG. 9 may be combined. In another example, the description of the rectifier circuit 231 in FIG. 11 may be combined with the implementation of the wireless charging module 20 shown in FIG. 12 or FIG. 13. A combination of these different implementations should also fall within the protection scope of this application.

An embodiment of this application further provides a control circuit. The control circuit is applicable to the wireless charging module 20 in a scenario in which the electronic device 10 works as a wireless charging transmitting device, and may be the control circuit 24. The control circuit is configured to control functional units of the wireless charging module 20 to work together, so that the wireless charging module 20 can receive a direct current and transmit an alternating magnetic field.

An embodiment of this application further provides a control circuit. The control circuit is applicable to the wireless charging module 20 in a scenario in which the electronic device 10 works as a wireless charging receiving device, and may be the control circuit 24. The control circuit is configured to control functional units of the wireless charging module 20 to work together, so that the wireless charging module 20 can receive an alternating magnetic field and output a direct current.

An embodiment of this application further provides a control circuit. The control circuit is applicable to the wireless charging module 20 in a scenario in which the electronic device 10 can work as both a wireless charging receiving device and a wireless charging transmitting device, and may be the control circuit 24. The control circuit is configured to control functional units of the wireless charging module 20 to work together, so that the wireless charging module 20 can receive an alternating magnetic field and output a direct current, or the wireless charging module 20 can receive a direct current and transmit an alternating magnetic field.

In embodiments provided in this application, it should be understood that the disclosed systems, apparatuses, or methods may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

An "embodiment" mentioned in this specification means that a particular feature, structure, or characteristic described with reference to this embodiment may be included in at least one embodiment of this application. The phrase appearing at various locations in this specification may neither necessarily mean a same embodiment, nor mean an independent or optional embodiment exclusive from another embodiment. It is explicitly and implicitly understood by a person skilled in the art that embodiments described in this specification may be combined with another embodiment.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

The invention claimed is:

1. A wireless charging module, wherein the wireless charging module is configured to receive an alternating magnetic field generated by a wireless power supply device, and the wireless charging module comprises a control circuit, a charging coil, a tunable capacitor module, and a rectifier circuit, wherein:
   the tunable capacitor module is connected in series between the charging coil and the rectifier circuit;
   the tunable capacitor module comprises a plurality of capacitors and at least one controllable switch;
   the charging coil is configured to receive the alternating magnetic field generated by the wireless power supply device and output an alternating current;
   the rectifier circuit is configured to convert the alternating current into a direct current;
   the wireless charging module is configured such that:
      when the wireless power supply device runs in a constant-frequency voltage-regulation mode, the control circuit is configured to control one or more of the at least one controllable switch to be turned off; or
      when the wireless power supply device runs in a constant-voltage frequency-regulation mode, the control circuit is configured to control all the at least one controllable switch to be turned on; and
   the control circuit is configured to:
      control the at least one controllable switch to be turned on or off, to control an equivalent capacitance value of the tunable capacitor module, wherein the equivalent capacitance value of the tunable capacitor module comprises one of a first capacitance value or a second capacitance value; and
      control, based on an induced voltage of the charging coil, the rectifier circuit to run in a half-bridge voltage-multiplying rectification mode or a full-bridge rectification mode.

2. The wireless charging module according to claim 1, wherein:
   the tunable capacitor module comprises a first capacitor, at least one parallel capacitor, and the at least one controllable switch,
   the first capacitor is connected in series between the charging coil and the rectifier circuit, and
   the at least one parallel capacitor is connected in parallel to the first capacitor by using the at least one controllable switch,
   wherein the wireless charging module is configured such that:
      when one or more of the at least one controllable switch are turned off, the equivalent capacitance value of the tunable capacitor module is equal to the first capacitance value; and
      when the at least one controllable switch is all turned on, the equivalent capacitance value of the tunable capacitor module is equal to the second capacitance value.

3. The wireless charging module according to claim 1, wherein:
   the tunable capacitor module comprises a first capacitor, at least one series capacitor, and the at least one controllable switch,
   the first capacitor and the at least one series capacitor are connected in series between the charging coil and the rectifier circuit, and
   the at least one controllable switch is separately connected in parallel to the at least one series capacitor,
   wherein the wireless charging module is configured such that:
      when one or more of the at least one controllable switch are turned off, the equivalent capacitance value of the tunable capacitor module is equal to the first capacitance value; and
      when the at least one controllable switch is all turned on, the equivalent capacitance value of the tunable capacitor module is equal to the second capacitance value.

4. The wireless charging module according to claim 1, wherein the rectifier circuit comprises a first half bridge and a second half bridge that are connected in parallel, and the control circuit is configured to:
   when the induced voltage of the charging coil is less than or equal to a preset voltage:
      control an upper bridge arm and a lower bridge arm of the first half bridge to be alternately turned on or off;
      control an upper bridge arm of the second half bridge to be turned on and a lower bridge arm of the second half bridge to be turned off; or
      control the upper bridge arm of the second half bridge to be turned off and the lower bridge arm of the second half bridge to be turned on, wherein the rectifier circuit runs in the half-bridge voltage-multiplying rectification mode; and
   when the induced voltage of the charging coil is greater than the preset voltage:
      control both the upper bridge arm of the first half bridge and the lower bridge arm of the second half bridge and both the lower bridge arm of the first half bridge and the upper bridge arm of the second half bridge to be alternately turned on or off, wherein the rectifier circuit runs in the full-bridge rectification mode.

5. The wireless charging module according to claim 1, wherein:
   the control circuit is configured to control one or more of the at least one controllable switch of the tunable capacitor module to be turned off, wherein at a resonance frequency of the tunable capacitor module and the charging coil is equal to a preset frequency or a working frequency of the alternating magnetic field provided by the wireless power supply device; and the control circuit is configured to control all the at least one controllable switch to be turned on, wherein the resonance frequency of the tunable capacitor module and the charging coil is less than a minimum working frequency of the alternating magnetic field provided by the wireless power supply device.

6. A control circuit for a wireless charging module, wherein the wireless charging module is configured to receive an alternating magnetic field provided by a wireless power supply device, the wireless charging module comprises the control circuit, a charging coil, a tunable capacitor module, and a rectifier circuit, the charging coil is configured to receive the alternating magnetic field, the tunable capacitor module is connected in series between the charging coil and the rectifier circuit, the tunable capacitor module comprises a plurality of capacitors and at least one controllable switch, wherein the control circuit is configured to:
control the at least one controllable switch to be turned on or off, to control an equivalent capacitance value of the tunable capacitor module, wherein the equivalent capacitance value of the tunable capacitor module comprises one of a first capacitance value or a second capacitance value;
when the wireless power supply device runs in a constant-voltage frequency-regulation mode, control the equivalent capacitance value of the tunable capacitor module to be equal to the first capacitance value; or
when the wireless power supply device runs in a constant-frequency voltage-regulation mode, control the equivalent capacitance value of the tunable capacitor module to be equal to or less than the second capacitance value and greater than the first capacitance value; and
control, based on an induced voltage of the charging coil, the rectifier circuit to run in a half-bridge voltage-multiplying rectification mode or a full-bridge rectification mode.

7. The control circuit according to claim 6, wherein the control circuit is configured to:
when the induced voltage of the charging coil is less than or equal to a preset voltage, control the rectifier circuit to run in the half-bridge voltage-multiplying rectification mode; and
when the induced voltage of the charging coil is greater than the preset voltage, control the rectifier circuit to work in the full-bridge rectification mode.

8. The control circuit according to claim 6, wherein the rectifier circuit comprises a first half bridge and a second half bridge that are connected in parallel, and the control circuit is configured to:
control an upper bridge arm and a lower bridge arm of the first half bridge to be alternately turned on or off,
control an upper bridge arm of the second half bridge to be turned on and a lower bridge arm of the second half bridge to be turned off, or
control the upper bridge arm of the second half bridge to be turned off and the lower bridge arm of the second half bridge to be turned on, wherein the rectifier circuit runs in the half-bridge voltage-multiplying rectification mode; or
control both an upper bridge arm of the first half bridge and a lower bridge arm of the second half bridge and both a lower bridge arm of the first half bridge and an upper bridge arm of the second half bridge to be alternately turned on or off, wherein the rectifier circuit runs in the full-bridge rectification mode.

9. An electronic device comprising a wireless charging module, wherein the wireless charging module is configured to receive an alternating magnetic field generated by a wireless power supply device, and wherein:
the wireless charging module comprises a control circuit, a charging coil, a tunable capacitor module, and a rectifier circuit;
the tunable capacitor module is connected in series between the charging coil and the rectifier circuit;
the tunable capacitor module comprises a plurality of capacitors and at least one controllable switch;
the charging coil is configured to receive the alternating magnetic field generated by the wireless power supply device and output an alternating current;
the rectifier circuit is configured to convert the alternating current into a direct current;
the electronic device is configured such that:
when the wireless power supply device runs in a constant-frequency voltage-regulation mode, the control circuit is configured to control one or more of the at least one controllable switch to be turned off; or
when the wireless power supply device runs in a constant-voltage frequency-regulation mode, the control circuit is configured to control all the at least one controllable switch to be turned on; and
the control circuit is configured to:
control the at least one controllable switch to be turned on or off, to control an equivalent capacitance value of the tunable capacitor module, wherein the equivalent capacitance value of the tunable capacitor module comprises one of a first capacitance value or a second capacitance value; and
control, based on an induced voltage of the charging coil, the rectifier circuit to run in a half-bridge voltage-multiplying rectification mode or a full-bridge rectification mode.

10. The electronic device according to claim 9, wherein:
the tunable capacitor module comprises a first capacitor, at least one parallel capacitor, and the at least one controllable switch,
the first capacitor is connected in series between the charging coil and the rectifier circuit, and
the at least one parallel capacitor is connected in parallel to the first capacitor by using the at least one controllable switch,
wherein the electronic device is configured such that:
when one or more of the at least one controllable switch are turned off, the equivalent capacitance value of the tunable capacitor module is equal to the first capacitance value; and
when the at least one controllable switch is all turned on, the equivalent capacitance value of the tunable capacitor module is equal to the second capacitance value.

11. The electronic device according to claim 9, wherein:
the tunable capacitor module comprises a first capacitor, at least one series capacitor, and the at least one controllable switch,
the first capacitor and the at least one series capacitor are connected in series between the charging coil and the rectifier circuit, and
the at least one controllable switch is separately connected in parallel to the at least one series capacitor, wherein the electronic device is configured such that:
when one or more of the at least one controllable switch are turned off, the equivalent capacitance value of the tunable capacitor module is equal to the first capacitance value; and
when the at least one controllable switch is all turned on, the equivalent capacitance value of the tunable capacitor module is equal to the second capacitance value.

* * * * *